(12) United States Patent
Han et al.

(10) Patent No.: US 11,212,791 B2
(45) Date of Patent: Dec. 28, 2021

(54) COMMUNICATION METHOD AND COMMUNICATIONS NODE

(71) Applicant: Huawei Technologies Co., Ltd., Shenzhen (CN)

(72) Inventors: Xiao Han, Shenzhen (CN); Yunbo Li, Shenzhen (CN); Mengyao Ma, Shenzhen (CN); Xun Yang, Shenzhen (CN); Yuchen Guo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 104 days.

(21) Appl. No.: 16/720,798

(22) Filed: Dec. 19, 2019

(65) Prior Publication Data

US 2020/0128524 A1     Apr. 23, 2020

Related U.S. Application Data

(63) Continuation of application No. PCT/CN2018/090182, filed on Jun. 7, 2018.

(30) Foreign Application Priority Data

Jun. 22, 2017    (CN) ...................... 201710482865.X

(51) Int. Cl.
    *H04W 72/04*       (2009.01)
    *H04B 7/06*        (2006.01)

(52) U.S. Cl.
    CPC ........ *H04W 72/044* (2013.01); *H04B 7/0617* (2013.01)

(58) Field of Classification Search
    CPC .............. H04W 72/044; H04W 72/085; H04B 7/0617; H04B 7/0695
    See application file for complete search history.

(56) References Cited

U.S. PATENT DOCUMENTS

| | | | |
|---|---|---|---|
| 2008/0175197 A1 | 7/2008 | Shao et al. | |
| 2013/0058298 A1* | 3/2013 | Xu ........................ | H04W 48/16 370/329 |
| 2016/0044711 A1* | 2/2016 | Lou ................... | H04W 72/1284 370/338 |
| 2017/0006631 A1 | 1/2017 | Tian et al. | |

(Continued)

FOREIGN PATENT DOCUMENTS

| | | |
|---|---|---|
| CN | 104918228 A | 9/2015 |
| CN | 105052235 A | 11/2015 |

(Continued)

OTHER PUBLICATIONS

Machine Translation and Abstract of Chinese Publication No. CN106686729, May 17, 2017, 59 pages.

(Continued)

*Primary Examiner* — Khanh C Tran

(74) *Attorney, Agent, or Firm* — Conley Rose, P.C.

(57) ABSTRACT

A communication method and a communications node includes sending, by a sending node, a first frame to a receiving node on a first channel, and sending at least one second frame to the receiving node on a second channel, where a frequency of the first channel is less than a frequency of the second channel, where each second frame corresponds to a sending direction, and a length of each second frame is less than a preset frame length.

20 Claims, 15 Drawing Sheets

(56) References Cited

U.S. PATENT DOCUMENTS

| | | | |
|---|---|---|---|
| 2017/0222707 A1 | 8/2017 | Chen et al. | |
| 2019/0090253 A1* | 3/2019 | Da Silva | H04W 72/085 |
| 2019/0297646 A1* | 9/2019 | Lou | H04W 72/1284 |

FOREIGN PATENT DOCUMENTS

| | | |
|---|---|---|
| CN | 105530036 A | 4/2016 |
| CN | 106686729 A | 5/2017 |

OTHER PUBLICATIONS

Toyoda, I., et al., "Collaboration between 2.4/5 and 60 GHz," IEEE 802.11-10/492r02, May 19, 2010, 15 pages.

Foreign Communication From A Counterpart Application, PCT Application No. PCT/CN2018/090182, English Translation of International Search Report dated Aug. 21, 2018, 2 pages.

Foreign Communication From A Counterpart Application, PCT Application No. PCT/CN2018/090182, English Translation of Written Opinion dated Aug. 21, 2018, 5 pages.

* cited by examiner

| Element identifier | Length | High throughput capability information | Supported high throughput-modulation and coding scheme and number of spatial streams set |
|---|---|---|---|
| 1 | 1 | 4 | 8 |

Byte

FIG. 5

| Bit | B0 | B15 | B16 | B28 | B29 | B31 | B32 | B47 | B48 | B60 | B61 | B62 | B63 |
|---|---|---|---|---|---|---|---|---|---|---|---|---|---|
| | Receive high throughput-modulation and coding scheme map | | Receive highest supported long guard interval data rate | | Maximum number of total space-time streams | | Transmit high throughput-modulation and coding scheme map | | Transmit highest supported long guard interval data rate | | High throughput extended number of spatial streams bandwidth capable | | Reserved |
| | 16 | | 13 | | 3 | | 16 | | 13 | | 1 | | 2 |

FIG. 6

| Element identifier | Length | High efficient media access control capability information | High efficient physical capability information | Transmit or receive high efficient modulation and coding scheme and number of spatial streams support | Physical padding extension threshold |
|---|---|---|---|---|---|
| 1 | 1 | 5 | 9 | Two or more | Variable |

Byte

FIG. 7

| | B0 | B1 | B2 | B3 | B4 B5 | B6 B7 | B8 B9 B10 | B11 B12 | B13 B14 |
|---|---|---|---|---|---|---|---|---|---|
| | High throughput control high efficient support | Target wake time requester support | Target wake time responder support | Fragmentation support | Maximum number of fragmented MAC service data units | Minimum fragment size | Trigger frame MAC padding duration | Multi-tunnel identifier aggregation support | |
| Bit | 1 | 1 | 1 | 2 | 3 | 2 | 2 | 3 | |

| | B15 B16 | B17 | B18 | B19 | B20 | B21 | B22 | B23 | B24 |
|---|---|---|---|---|---|---|---|---|---|
| | High efficient link adaptation | All response support | Uplink multi-user responder planning support | Aggregate buffer status report support | Broadcast target wake time support | 32-bit block response bitmap support | Multi-user cascade support | Response-enabled multi-tunnel identifier aggregation support | Group addressed multi-station block response in downlink multi-user support |
| Bit | 2 | 1 | 1 | 1 | 1 | 1 | 1 | 1 | 1 |

| | B25 | B26 | B27 | B28 | B29 | B30 | B31 B32 | B39 |
|---|---|---|---|---|---|---|---|---|
| | Operating mode indication aggregate control support | Orthogonal frequency division multiple access receiver address support | Maximum aggregate MAC protocol data unit length support | Downlink multi-user multiple-input multiple-output on polarization bandwidth receive | Uplink multi-user multiple-input multiple-output | Reserved | | |
| Bit | 1 | 1 | 2 | 1 | 2 | 8 | | |

FIG. 8

| Element identifier | Length | Station address | Associated identifier | Directional multi-gigabit station capability information | Directional multi-gigabit access point or basic service set control point capability information | Directional multi-gigabit station beam tracking time limit | Extended single carrier modulation and coding scheme capability | Maximum number of basic aggregate MAC service data unit subframes in an aggregate MAC service data unit | Maximum number of short aggregate MAC service data unit subframes in an aggregate MAC service data unit |
|---|---|---|---|---|---|---|---|---|---|
| | 1 | 6 | 1 | 8 | 2 | 2 | 1 | 1 | 1 |

Byte

FIG. 9

| Bit | B1 | B2 | B3 | B4 B5 | B6 | B7 B13 |
|---|---|---|---|---|---|---|
| | Reverse direction | Higher layer timer synchronization | Transmission power control | Spatial sharing with interference mitigation | Number of receive directional multi-gigabit antennas | Fast link adaptation | Total number of sectors |
| | 1 | 1 | 1 | 1 | 2 | 1 | 7 |

| Bit | B14 B19 | B20 | B21 B26 | B27 | B28 B51 | B52 |
|---|---|---|---|---|---|---|
| | Receive sector sweep length | Directional multi-gigabit antenna reciprocity | Aggregate MAC protocol data unit parameter | Block response with flow control | Supported modulation and coding scheme set | Dynamic trunking protocol supported |
| | 6 | 1 | 6 | 1 | 24 | 1 |

| Bit | B52 | B54 | B55 | B56 | B57 B59 | B60 | B61 | B62 B63 |
|---|---|---|---|---|---|---|---|---|
| | Aggregate physical protocol data unit supported | Heartbeat | Supported other associated identifier | Antenna pattern reciprocity | Heartbeat running indication | Grant response supported | Receive sector sweep transmit rate supported | Reserved |
| | 1 | 1 | 1 | 1 | 3 | 1 | 1 | 2 |

FIG. 10

| L-STF | L-CEF | L-header | EDMG header A | EDMG-STF | EDMG-CEF | EDMG header B |
FIG. 19
| L-STF | L-CEF | L-header | FDMG header A | FDMG-STF | FDMG-CEF | FDMG header B |
FIG. 20
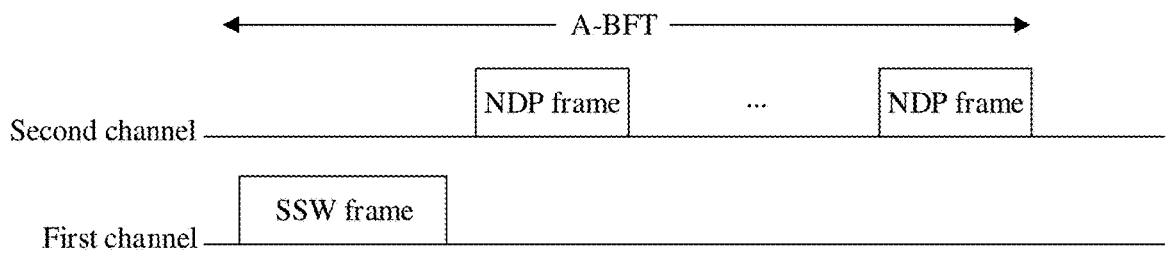
FIG. 21
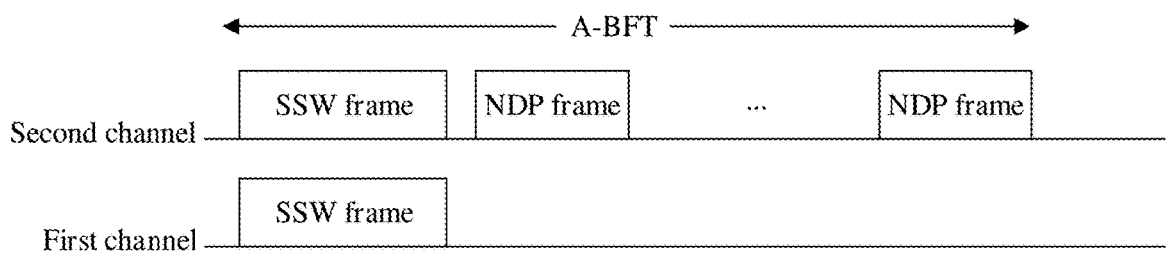
FIG. 22
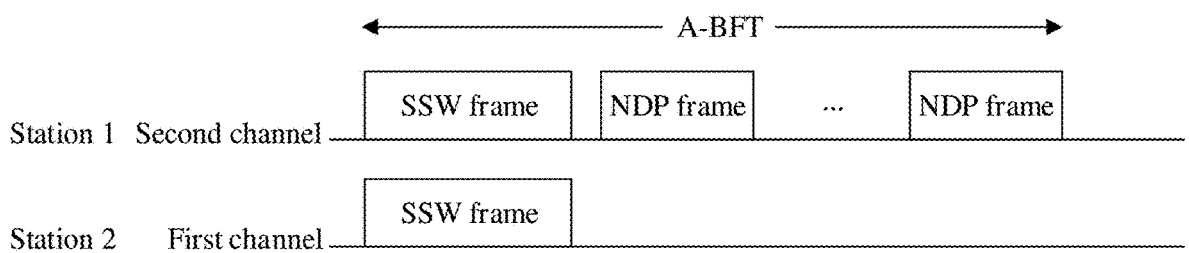
FIG. 23

COMMUNICATION METHOD AND COMMUNICATIONS NODE

CROSS-REFERENCE TO RELATED APPLICATIONS

This application is a continuation application of International Application No. PCT/CN2018/090182, filed on Jun. 7, 2018, which claims priority to Chinese Patent Application No. 201710482865.X, filed on Jun. 22, 2017. The disclosures of the aforementioned applications are incorporated herein by reference in their entireties.

TECHNICAL FIELD

This application relates to communications technologies, and in particular, to a communication method and a communications node.

BACKGROUND

As one of main technologies of wireless local area network communication, millimeter wave wireless communication can implement relatively high communication efficiency because an available bandwidth of a millimeter-wave band is very large.

However, signal attenuation is severe and a path loss is very large on a millimeter-wave channel. Therefore, in millimeter wave communication, receive and transmit beams need to be aligned through beamforming (BF) training, and data is received and sent based on the aligned receive and transmit beams such that a gain of a receive/transmit antenna can be effectively increased to alleviate signal attenuation.

Because beamforming training performed on the millimeter-wave channel, namely, a high frequency channel, is relatively time-consuming, efficiency of the millimeter wave communication is relatively low, and a network throughput of the millimeter wave communication is limited.

SUMMARY

This application provides a communication method and a communications node, to improve network communication efficiency and a network throughput.

According to a first aspect, an embodiment of this application provides a communication method, including sending, by a sending node, a first frame to a receiving node on a first channel; and sending, by the sending node, at least one second frame to the receiving node on a second channel, where a frequency of the first channel is less than a frequency of the second channel, each second frame corresponds to one sending direction, and a length of each second frame is less than a preset frame length.

In the communication method, coordinated communication is performed on channels of different frequencies to send information to the receiving node, the at least one second frame corresponding to a sending direction is sent on the second channel of a higher frequency, and a first frame is sent on the first channel of a lower frequency. Due to sharing and coordination of the first channel, the length of the second frame transmitted on the second channel is less than the preset frame length. Therefore, duration for which beamforming training is performed on the second channel can be reduced, and overall network communication efficiency and a network throughput can be improved.

In addition, in the communication method, the first channel has a relatively low frequency, relatively low signal attenuation, and a relatively small path loss. Therefore, to-be-transmitted information on the second channel is carried in the first frame sent on the first channel such that information transmission robustness can be effectively improved, and network performance can be improved.

Optionally, in the communication method, the sending node needs to send the first frame on the first channel. Therefore, before sending the first frame, the sending node needs to first perform clear channel assessment (CCA) on the first channel to determine whether the first channel is idle. If the first channel is clear, the sending node sends the first frame on the first channel.

Because the sending node further sends the at least one second frame on the second channel, the sending node further needs to first perform CCA on the second channel to determine whether the second channel is clear. If the second channel is clear, the sending node sends the at least one second frame on the second channel.

In a possible implementation, the sending, by the sending node, at least one second frame to the receiving node on a second channel shown above includes sending, by the sending node, the at least one second frame to the receiving node on the second channel after a preset time interval starting from a moment at which sending of the first frame ends.

In the method, the sending node sends the at least one second frame after the preset time interval starting from the moment at which sending of the first frame ends such that the receiving node can accurately identify the second frame sent on the second channel.

In another possible implementation, the method may further include, when the sending node sends the first frame to the receiving node on the first channel, further sending, by the sending node, a third frame to the receiving node on the second channel.

The third frame includes one first frame and one second frame, or one second frame and a training sequence.

When determining that both the first channel and the second channel are clear, the sending node may send the first frame to the receiving node on the first channel, and may further send the third frame to the receiving node on the second channel. In this way, the first channel and the second channel can be occupied, to avoid a conflict caused because the first channel and the second channel are preempted by other nodes.

In the method, the third frame may be the second frame and the training sequence, and the training sequence may also correspond to one or more sending and/or receiving directions, to increase a quantity of sector sweep directions, and reduce a sweep time.

In still another possible implementation, the first frame includes some to-be-transmitted information on the second channel; and the second frame includes remaining to-be-transmitted information on the second channel.

In yet another possible implementation, the first frame includes an identifier of a sending direction corresponding to the at least one second frame.

In yet another possible implementation, each second frame includes an identifier of a sending direction corresponding to each second frame.

In yet another possible implementation, the first frame includes to-be-transmitted information on the first channel and/or to-be-transmitted information on the second channel.

In yet another possible implementation, in a beacon transmission interval (BTI), the first frame includes a beacon frame; and the second frame includes any one of the following, for example, a null data packet (NDP) frame, a short sector sweep (SSSW) frame, a non-quality-of-service (QoS non) frame, a short beacon frame, and a frame including only a physical layer header.

In yet another possible implementation, in a sector sweep phase, the sector sweep phase is within an association beamforming training (A-BFT) period or a data transfer interval (DTI).

The first frame includes a sector sweep SSW frame or an SSSW frame, and the second frame includes an NDP frame or a frame including only a physical layer header.

In yet another possible implementation, the first frame includes first indication information, and the first indication information is used to indicate communication capabilities of the sending node on the first channel and the second channel.

In yet another possible implementation, the first frame further includes second indication information, and the second indication information is used to indicate whether the second frame is sent on the second channel in a current transmission period.

In yet another possible implementation, the first frame further includes third indication information, and the third indication information is used to indicate a sending start time of the second frame in the current transmission period or a relative time interval between the sending start time and a preset time.

In yet another possible implementation, the first frame further includes fourth indication information, and the fourth indication information is used to indicate whether the first frame is sent on the first channel and the at least one second frame is sent on the second channel, in a transmission period after the current transmission period.

In yet another possible implementation, the first frame further includes fifth indication information, and the fifth indication information is used to indicate a sending time of the first frame in the transmission period after the current transmission period, a relative time interval between the sending time of the first frame in the transmission period after the current transmission period and a preset time in the current transmission period, or an identifier of the transmission period that is after the current transmission period and in which the first frame is located.

According to a second aspect, an embodiment of this application further provides a communication method, including receiving, by a receiving node on a first channel, a first frame sent by a sending node; and receiving, by the receiving node on a second channel, at least one second frame sent by the sending node, where a frequency of the first channel is less than a frequency of the second channel, each second frame corresponds to one sending direction, and a length of each second frame is less than a preset frame length.

In a possible implementation, the at least one second frame shown above is sent by the sending node after a preset time interval starting from a moment at which sending of the first frame ends.

In another possible implementation, before the receiving, by the receiving node on a second channel, at least one second frame sent by the sending node shown above, the method further includes receiving, by the receiving node on the first channel, a third frame sent by the sending node, where the third frame is sent when the sending node sends the first frame to the receiving node on the first channel; and the third frame may include one first frame and one second frame, or one second frame and a training sequence.

In still another possible implementation, the first frame includes some to-be-transmitted information on the second channel; and the second frame includes remaining to-be-transmitted information on the second channel.

In yet another possible implementation, the first frame includes an identifier of a sending direction corresponding to the at least one second frame.

In yet another possible implementation, each second frame includes an identifier of a sending direction corresponding to each second frame.

In yet another possible implementation, in a BTI, the first frame includes a beacon frame; and the second frame includes any one of the following such as a NDP frame, a SSSW frame, a QoS non frame, a short beacon frame, and a frame including only a physical layer header.

In yet another possible implementation, in a sector sweep phase, the sector sweep phase is within an A-BFT period or a DTI.

The first frame includes a SSW frame or an SSSW frame, and the second frame includes an NDP frame or a frame including only a physical layer header.

In yet another possible implementation, the first frame includes first indication information.

The method may further include determining, by the receiving node, communication capabilities of the sending node on the first channel and the second channel based on the first indication information.

In yet another possible implementation, the first frame further includes second indication information.

The method may further include determining, by the receiving node based on the second indication information, whether the second frame is sent on the second channel in a current transmission period.

In yet another possible implementation, the first frame further includes third indication information.

The method may further include determining, by the receiving node, a sending start time of the second frame in the current transmission period or a relative time interval between the sending start time and a preset time based on the third indication information.

In yet another possible implementation, the first frame further includes fourth indication information.

The method further includes determining, by the receiving node based on the fourth indication information, whether the first frame is sent on the first channel and the at least one second frame is sent on the second channel, in a transmission period after the current transmission period.

In yet another possible implementation, the first frame further includes fifth indication information.

The method may further include determining, by the receiving node based on the fifth indication information, a sending time of the first frame in the transmission period after the current transmission period, a relative time interval between the sending time of the first frame in the transmission period after the current transmission period and a preset time in the current transmission period, or an identifier of the transmission period that is after the current transmission period and in which the first frame is located.

According to a third aspect, an embodiment of this application further provides a communications node. The communications node may serve as a sending node, and includes a processing module configured to control to send a first frame to a receiving node on a first channel, and to send at least one second frame to the receiving node on a second channel, where a frequency of the first channel is less than a frequency of the second channel, each second frame corresponds to one sending direction, and a length of each second frame is less than a preset frame length; and a sending module configured to send the first frame to the receiving node on the first channel, and send the at least one second frame to the receiving node on the second channel.

In a possible implementation, the processing module is further configured to control to send the at least one second frame to the receiving node on the second channel after a preset time interval starting from a moment at which sending of the first frame ends.

In another possible implementation, the processing module is further configured to, when sending the first frame to the receiving node on the first channel, control to send a third frame to the receiving node on the second channel, where the third frame includes one first frame and one second frame, or one second frame and a training sequence.

The sending module is further configured to send the third frame to the receiving node on the second channel.

In still another possible implementation, the first frame includes some to-be-transmitted information on the second channel; and the second frame includes remaining to-be-transmitted information on the second channel.

In yet another possible implementation, the first frame includes an identifier of a sending direction corresponding to the at least one second frame.

In yet another possible implementation, each second frame includes an identifier of a sending direction corresponding to each second frame.

In yet another possible implementation, the first frame includes to-be-transmitted information on the first channel and/or to-be-transmitted information on the second channel.

In yet another possible implementation, in a BTI, the first frame includes a beacon frame; and the second frame includes any one of the following such as a NDP frame, a SSSW frame, a QoS non frame, a short beacon frame, and a frame including only a physical layer header.

In yet another possible implementation, in a sector sweep phase, the sector sweep phase is within an A-BFT period or a DTI.

The first frame includes a SSW frame or an SSSW frame, and the second frame includes an NDP frame or a frame including only a physical layer header.

In yet another possible implementation, the first frame includes first indication information, and the first indication information is used to indicate communication capabilities of the sending node on the first channel and the second channel.

In yet another possible implementation, the first frame further includes second indication information, and the second indication information is used to indicate whether the second frame is sent on the second channel in a current transmission period.

In yet another possible implementation, the first frame further includes third indication information, and the third indication information is used to indicate a sending start time of the second frame in the current transmission period or a relative time interval between the sending start time and a preset time.

In yet another possible implementation, the first frame further includes fourth indication information, and the fourth indication information is used to indicate whether the first frame is sent on the first channel and the at least one second frame is sent on the second channel, in a transmission period after the current transmission period.

In yet another possible implementation, the first frame further includes fifth indication information, and the fifth indication information is used to indicate a sending time of the first frame in the transmission period after the current transmission period, a relative time interval between the sending time of the first frame in the transmission period after the current transmission period and a preset time in the current transmission period, or an identifier of the transmission period that is after the current transmission period and in which the first frame is located.

According to a fourth aspect, an embodiment of this application further provides a communications node. The communications node may serve as a receiving node, and includes a processing module configured to control to receive, on a first channel, a first frame sent by a sending node, and to receive, on a second channel, at least one second frame sent by the sending node, where a frequency of the first channel is less than a frequency of the second channel, each second frame corresponds to one sending direction, and a length of each second frame is less than a preset frame length; and a receiving module configured to receive, on the first channel, the first frame sent by the sending node, and receive, on the second channel, the at least one second frame sent by the sending node.

In a possible implementation, the at least one second frame is sent by the sending node after a preset time interval starting from a moment at which sending of the first frame ends.

In another possible implementation, the processing module is further configured to control to receive, on the first channel, a third frame sent by the sending node, where the third frame is sent when the sending node sends the first frame to the receiving node on the first channel.

The third frame includes one first frame and one second frame, or one second frame and a training sequence.

The receiving module is further configured to receive, on the first channel, the third frame sent by the sending node.

In still another possible implementation, the first frame includes some to-be-transmitted information on the second channel; and the second frame includes remaining to-be-transmitted information on the second channel.

In yet another possible implementation, the first frame includes an identifier of a sending direction corresponding to the at least one second frame.

In yet another possible implementation, each second frame includes an identifier of a sending direction corresponding to each second frame.

In yet another possible implementation, in a BTI, the first frame includes a beacon frame; and the second frame includes any one of the following such as a NDP frame, a SSSW frame, a QoS non frame, a short beacon frame, and a frame including only a physical layer header.

In yet another possible implementation, in a sector sweep phase, the sector sweep phase is within an A-BFT period or a DTI.

The first frame includes a SSW frame or an SSSW frame, and the second frame is an NDP frame or a frame including only a physical layer header.

In yet another possible implementation, the first frame includes first indication information.

The processing module is further configured to determine communication capabilities of the sending node on the first channel and the second channel based on the first indication information.

In yet another possible implementation, the first frame further includes second indication information.

The processing module is further configured to determine, based on the second indication information, whether the second frame is sent on the second channel in a current transmission period.

In yet another possible implementation, the first frame further includes third indication information.

The processing module is further configured to determine a sending start time of the second frame in the current transmission period or a relative time interval between the sending start time and a preset time based on the third indication information.

In yet another possible implementation, the first frame further includes fourth indication information.

The processing module is further configured to determine, based on the fourth indication information, whether the first frame is sent on the first channel and the at least one second frame is sent on the second channel, in a transmission period after the current transmission period.

In yet another possible implementation, the first frame further includes fifth indication information.

The processing module is further configured to determine, based on the fifth indication information, a sending time of the first frame in the transmission period after the current transmission period, a relative time interval between the sending time of the first frame in the transmission period after the current transmission period and a preset time in the current transmission period, or an identifier of the transmission period that is after the current transmission period and in which the first frame is located.

According to a fifth aspect, an embodiment of this application may further provide a communications node. The communications node may serve as a sending node, and may include a processor and a transmitter. The processor is connected to the transmitter.

The processor is configured to control to send a first frame to a receiving node on a first channel, and to send at least one second frame to the receiving node on a second channel, where a frequency of the first channel is less than a frequency of the second channel, each second frame corresponds to one sending direction, and a length of each second frame is less than a preset frame length.

The transmitter is configured to send the first frame to the receiving node on the first channel, and send the at least one second frame to the receiving node on the second channel.

In a possible implementation, the processor is further configured to control to send the at least one second frame to the receiving node on the second channel after a preset time interval starting from a moment at which sending of the first frame ends.

In another possible implementation, the processor is further configured to, when sending the first frame to the receiving node on the first channel, control to send a third frame to the receiving node on the second channel, where the third frame includes one first frame and one second frame, or one second frame and a training sequence.

The transmitter is further configured to send the third frame to the receiving node on the second channel.

In still another possible implementation, the first frame includes some to-be-transmitted information on the second channel; and the second frame includes remaining to-be-transmitted information on the second channel.

In yet another possible implementation, the first frame includes an identifier of a sending direction corresponding to the at least one second frame.

In yet another possible implementation, each second frame includes an identifier of a sending direction corresponding to each second frame.

In yet another possible implementation, the first frame includes to-be-transmitted information on the first channel and/or to-be-transmitted information on the second channel.

In yet another possible implementation, in a BTI, the first frame includes a beacon frame; and the second frame includes any one of the following such as a NDP frame, a SSSW frame, a QoS non frame, a short beacon frame, and a frame including only a physical layer header.

In yet another possible implementation, in a sector sweep phase, the sector sweep phase is within an A-BFT period or a DTI.

The first frame includes a SSW frame or an SSSW frame, and the second frame includes an NDP frame or a frame including only a physical layer header.

In yet another possible implementation, the first frame includes first indication information, and the first indication information is used to indicate communication capabilities of the sending node on the first channel and the second channel.

In yet another possible implementation, the first frame further includes second indication information, and the second indication information is used to indicate whether the second frame is sent on the second channel in a current transmission period.

In yet another possible implementation, the first frame further includes third indication information, and the third indication information is used to indicate a sending start time of the second frame in the current transmission period or a relative time interval between the sending start time and a preset time.

In yet another possible implementation, the first frame further includes fourth indication information, and the fourth indication information is used to indicate whether the first frame is sent on the first channel and the at least one second frame is sent on the second channel, in a transmission period after the current transmission period.

In yet another possible implementation, the first frame further includes fifth indication information, and the fifth indication information is used to indicate a sending time of the first frame in the transmission period after the current transmission period, a relative time interval between the sending time of the first frame in the transmission period after the current transmission period and a preset time in the current transmission period, or an identifier of the transmission period that is after the current transmission period and in which the first frame is located.

According to a sixth aspect, an embodiment of this application further provides a communications node. The communications node may serve as a receiving node, and may include a processor and a receiver. The processor is connected to the receiver.

The processor is configured to control to receive, on a first channel, a first frame sent by a sending node, and to receive, on a second channel, at least one second frame sent by the sending node, where a frequency of the first channel is less than a frequency of the second channel, each second frame corresponds to one sending direction, and a length of each second frame is less than a preset frame length.

The receiver is configured to receive, on the first channel, the first frame sent by the sending node, and receive, on the second channel, the at least one second frame sent by the sending node.

In a possible implementation, the at least one second frame is sent by the sending node after a preset time interval starting from a moment at which sending of the first frame ends.

In another possible implementation, the processor is further configured to control to receive, on the first channel, a third frame sent by the sending node, where the third frame is sent when the sending node sends the first frame to the receiving node on the first channel; and the third frame includes one first frame and one second frame, or one second frame and a training sequence.

The receiver is further configured to receive, on the first channel, the third frame sent by the sending node.

In still another possible implementation, the first frame includes some to-be-transmitted information on the second channel; and the second frame includes remaining to-be-transmitted information on the second channel.

In yet another possible implementation, the first frame includes an identifier of a sending direction corresponding to the at least one second frame.

In yet another possible implementation, each second frame includes an identifier of a sending direction corresponding to each second frame.

In yet another possible implementation, in a BTI, the first frame includes a beacon frame; and the second frame includes any one of the following such as a NDP frame, a SSSW frame, a QoS non frame, a short beacon frame, and a frame including only a physical layer header.

In yet another possible implementation, in a sector sweep phase, the sector sweep phase is within an association beamforming training A-BFT period or a data transfer interval DTI.

The first frame includes a SSW frame or an SSSW frame, and the second frame includes an NDP frame or a frame including only a physical layer header.

In yet another possible implementation, the first frame includes first indication information.

The processor is further configured to determine communication capabilities of the sending node on the first channel and the second channel based on the first indication information.

In yet another possible implementation, the first frame further includes second indication information.

The processor is further configured to determine, based on the second indication information, whether the second frame is sent on the second channel in a current transmission period.

In yet another possible implementation, the first frame further includes third indication information.

The processor is further configured to determine a sending start time of the second frame in the current transmission period or a relative time interval between the sending start time and a preset time based on the third indication information.

In yet another possible implementation, the first frame further includes fourth indication information.

The processor is further configured to determine, based on the fourth indication information, whether the first frame is sent on the first channel and the at least one second frame is sent on the second channel, in a transmission period after the current transmission period.

In yet another possible implementation, the first frame further includes fifth indication information.

The processor is further configured to determine, based on the fifth indication information, a sending time of the first frame in the transmission period after the current transmission period, a relative time interval between the sending time of the first frame in the transmission period after the current transmission period and a preset time in the current transmission period, or an identifier of the transmission period that is after the current transmission period and in which the first frame is located.

According to a seventh aspect, an embodiment of this application further provides a computer program product. The computer program product includes corresponding program code used to perform any communication method that is performed by the sending node and that is provided in the first aspect of the embodiments of this application.

According to an eighth aspect, an embodiment of this application further provides a computer readable storage medium. The computer readable storage medium is configured to store a computer program product, and the computer program product includes program code. The program code may include corresponding program product used to perform any communication method that is performed by the sending node and that is provided in the first aspect of the embodiments of this application.

According to a ninth aspect, an embodiment of this application further provides a computer program product. The computer program product includes corresponding program code used to perform any communication method that is performed by the receiving node and that is provided in the second aspect of the embodiments of this application.

According to a tenth aspect, an embodiment of this application further provides a computer readable storage medium. The computer readable storage medium is configured to store a computer program product, and the computer program product includes program code. The program code may include corresponding program product used to perform any communication method that is performed by the receiving node and that is provided in the second aspect of the embodiments of this application.

According to the communication method and the communications node that are provided in the embodiments of this application, the sending node may send the first frame to the receiving node on the first channel, and send the at least one second frame to the receiving node on the second channel. The frequency of the first channel is less than the frequency of the second channel, each second frame corresponds to one sending direction, and the length of each second frame may be less than the preset frame length. In the communication method, coordinated communication is performed on channels of different frequencies to send information to the receiving node, the at least one second frame corresponding to a sending direction is sent on the second channel of a higher frequency, and the first frame is sent on the first channel of a lower frequency. Due to sharing and coordination of the first channel, the length of the second frame transmitted on the second channel is less than the preset frame length. Therefore, duration for which beamforming training is performed on the second channel can be reduced, and overall network communication efficiency and a network throughput can be improved.

BRIEF DESCRIPTION OF DRAWINGS

FIG. 5 is a schematic structural diagram of a very high throughput capability element according to an embodiment of this application;

FIG. 6 is a schematic structural diagram of a supported high throughout-modulation and coding scheme and number of spatial streams set field in a high throughput capability element according to an embodiment of this application;

FIG. 7 is a schematic structural diagram of a high efficient capability element according to an embodiment of this application;

FIG. 8 is a schematic structural diagram of a high efficient media access control layer capability information field in a high efficient capability element according to an embodiment of this application;

FIG. 9 is a schematic structural diagram of a directional multi-gigabit capability element according to an embodiment of this application;

FIG. 10 is a schematic structural diagram of a directional multi-gigabit station capability information field in a directional multi-gigabit capability element according to an embodiment of this application;

FIG. 19 is a schematic structural diagram of an enhanced directional multi-gigabit (EDMG) NDP frame in a communication method according to an embodiment of this application;

FIG. 20 is a schematic structural diagram of a future generation 60 GHz (FG60) NDP frame in a communication method according to an embodiment of this application;

FIG. 21 is a schematic diagram of frame transmission on a first channel and a second channel in an A-BFT phase in a communication method according to an embodiment of this application;

FIG. 22 is a schematic diagram of another frame transmission on a first channel and a second channel in A-BFT in a communication method according to an embodiment of this application;

FIG. 23 is a schematic diagram of still another frame transmission on a first channel and a second channel in A-BFT in a communication method according to an embodiment of this application;

DESCRIPTION OF EMBODIMENTS

Figure 1:
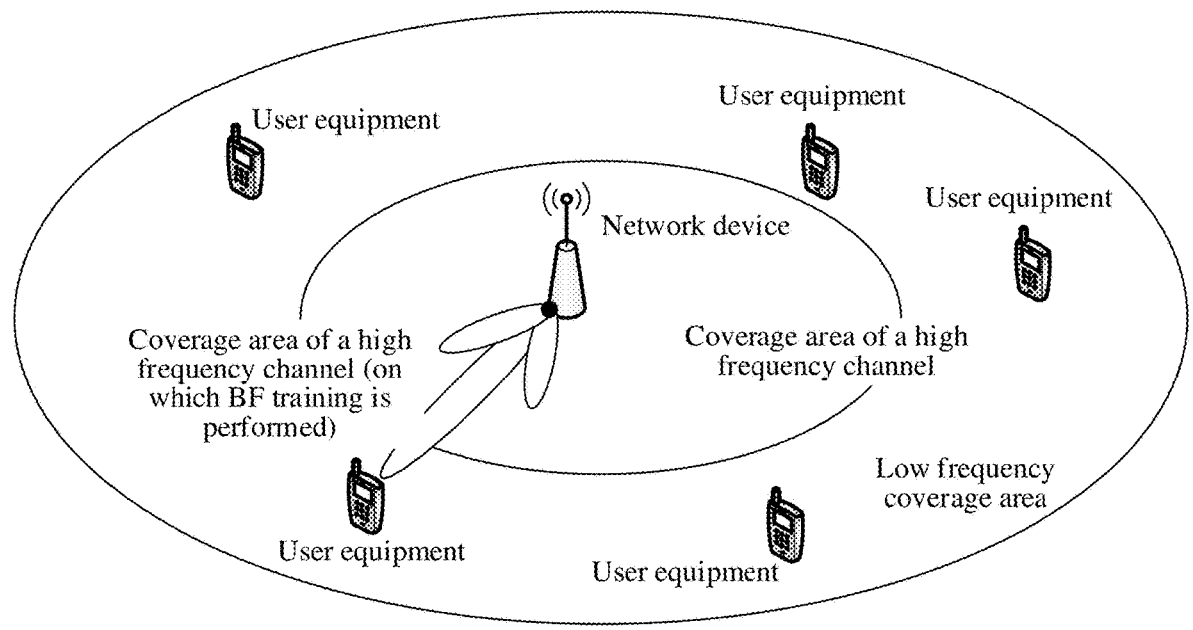
FIG. 1 is a schematic structural diagram of a network system to which embodiments of this application are applicable.

A communication method and a sending node that are provided in the embodiments of this application may be applied to a wireless local area network (WLAN) system, or may be applied to a mobile communications system or a mobile communications system corresponding to another mobile communications standard. If the communication method and the sending node are applicable to the WLAN system, the communication method and the sending node are especially applicable to a WLAN system in the 802.11ad standard, the 802.11ay standard, and a subsequent improved standard thereof. If the communication method and the sending node are applicable to the mobile communications system, the communication method and the sending node may be especially applied to a 5G communications system or another subsequent evolved mobile communications system. FIG. 1 is a schematic structural diagram of a network system to which embodiments of this application are applicable. As shown in FIG. 1, the network system to which a communication method is applicable may, for example, include one network device and at least one user equipment. For a WLAN system, the network device may be, for example, a basic service set control point (Personal Basic Service Set Control Point, PCP)/an access point (AP). The user equipment may be a station (Station, STA). For a mobile communications system, the network device may be, for example, any one of base stations such as a base transceiver station (BTS), a NodeB, and an evolved NodeB (eNB). This is not limited in this application. The user equipment may be any one of a subscriber unit, a subscriber station, a mobile station, a remote station, a remote terminal, an access terminal, a user terminal, a user agent, a user device, user equipment (UE), or the like.

It can be learned from FIG. 1 that different frequency channels have different signal transmission distances, in other words, have different coverage areas. A coverage area of a high frequency channel on which BF training is performed is greater than a coverage area of a high frequency channel on which no BF training is performed, and a coverage area of a low frequency channel may be greater than the coverage area of the high frequency channel on which BF training is performed.

A sending node in the following embodiments of this application may be a network device or user equipment, and a receiving node may be a network device or user equipment. For example, if the sending node is the network device, the receiving node is the user equipment or the network device. If the sending node is the user equipment, the receiving node may be the network device or the user equipment.

Figure 2:
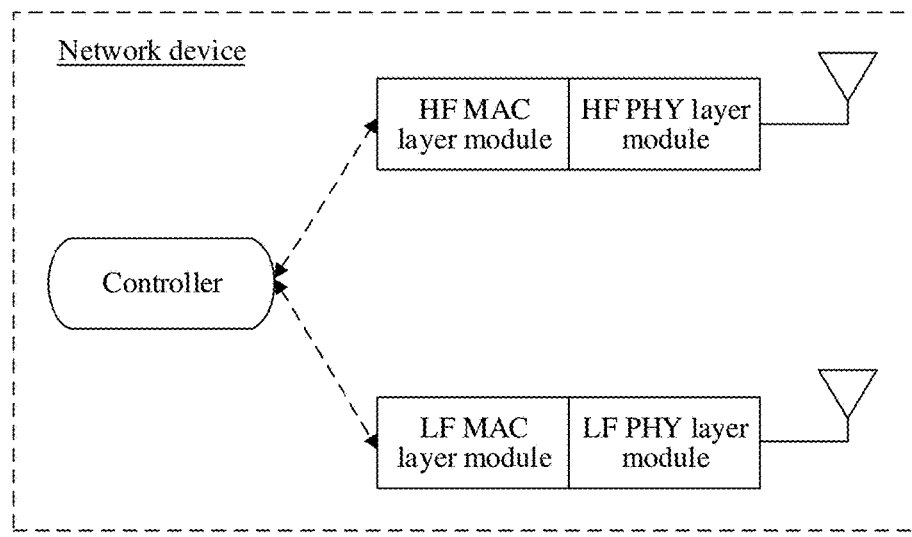
FIG. 2 is a schematic structural diagram of a network device according to an embodiment of this application.

In an implementation, a network device in the following embodiments of this application may be a dual-mode network device, namely, a network device in a low frequency (LF) channel communication mode and a high frequency (HF) channel communication mode. FIG. 2 is a schematic structural diagram of a network device according to an embodiment of this application. As shown in FIG. 2, the network device includes a controller, an HF module, and an LF module. The controller may store common information (common info) of the HF module and the LF module. The HF module may include an HF media access control (MAC) layer module and an HF physical (PHY) layer module. The LF module may include an LF MAC layer module and an LF PHY layer module. The controller may control and coordinate the HF module and the LF module. The HF module and the LF module may be located in a same chip in the network device, or may be located in separate chips.

Figure 3:
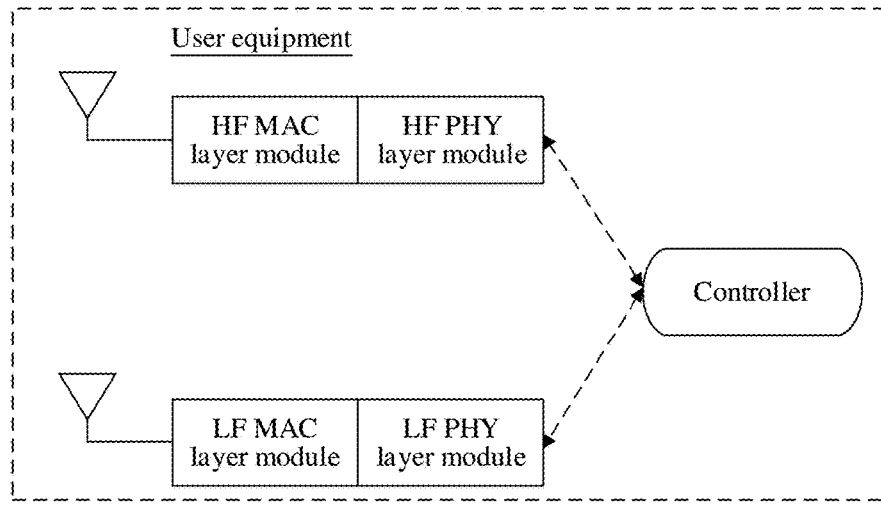
FIG. 3 is a schematic structural diagram of user equipment according to an embodiment of this application.

User equipment in the following embodiments of this application may be dual-mode user equipment, namely, user equipment in an LF channel communication mode and an HF channel communication mode. FIG. 3 is a schematic structural diagram of user equipment according to an embodiment of this application. As shown in FIG. 3, the user equipment includes a controller, an HF module, and an LF module. The controller may store common information of the HF module and the LF module. The HF module may include an HF MAC layer module and an HF PHY layer module. The LF module may include an LF MAC layer module and an LF PHY layer module. The controller may control and coordinate the HF module and the LF module. The HF module and the LF module may be located in a same chip in the user equipment, or may be located in separate chips.

In another implementation, a network device in the following embodiments of this application may alternatively be a single-mode network device, namely, a network device in an HF channel communication mode. The network device in the HF channel communication mode may include a controller and an HF module. The HF module may include an HF MAC layer module and an HF PHY layer module. The controller may control the HF module. User equipment in the following embodiments of this application may alternatively be single-mode user equipment, namely, user equipment in an HF channel communication mode. The user equipment in the HF channel communication mode may include a controller and an HF module. The HF module may include an HF MAC layer module and an HF PHY layer module. The controller may control the HF module.

The communication method provided in the embodiments of this application is described below with reference to a plurality of embodiments using an example.

Figure 4:
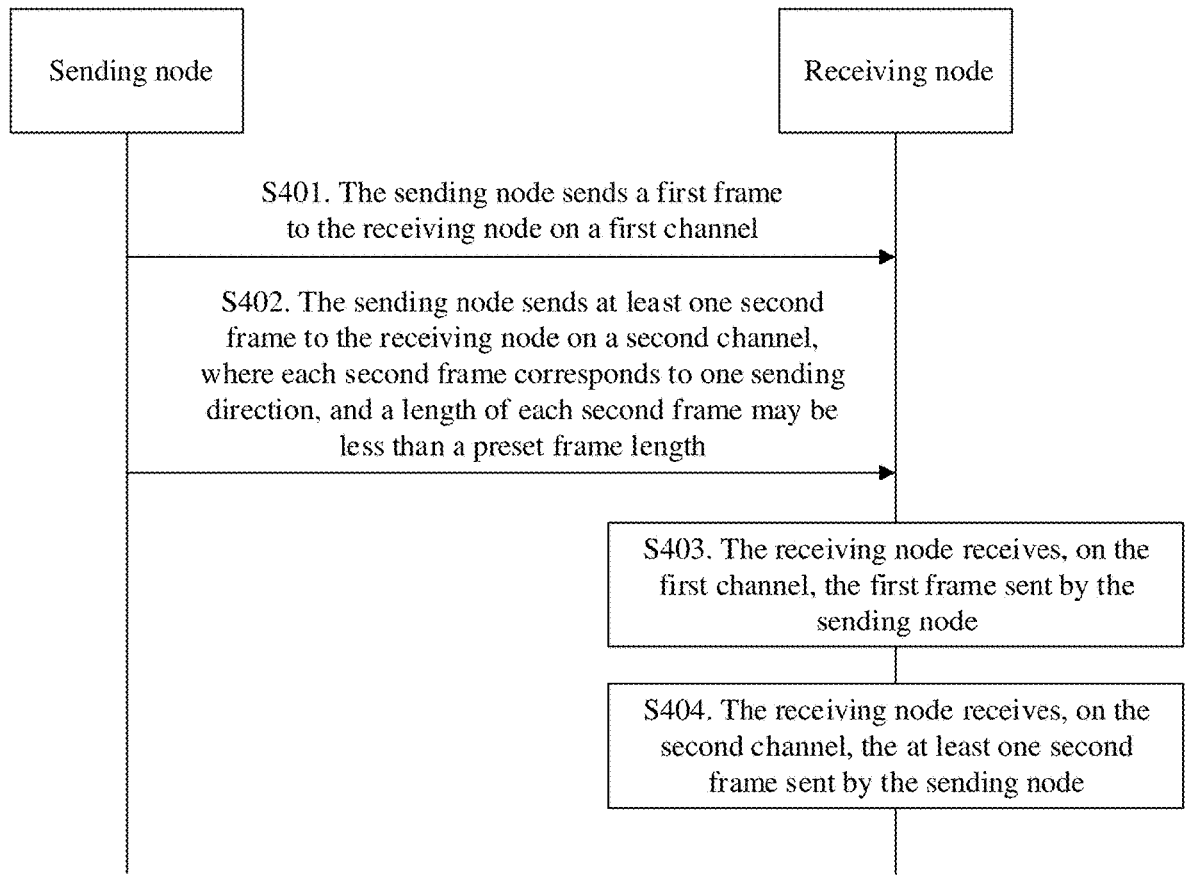
FIG. 4 is a flowchart of a communication method according to an embodiment of this application.

FIG. 4 is a flowchart of a communication method according to an embodiment of this application. As shown in FIG. 4, the communication method may include the following steps:

S401. A sending node sends a first frame to a receiving node on a first channel.

S402. The sending node sends at least one second frame to the receiving node on a second channel, where each second frame corresponds to one sending direction, and a length of each second frame may be less than a preset frame length.

Correspondingly, on a receiving node side, the method further includes the following steps:

S403. The receiving node receives, on the first channel, the first frame sent by the sending node.

S404. The receiving node receives, on the second channel, the at least one second frame sent by the sending node.

Further, if the communication method is applied to a dual-mode communication mode, a frequency of the first channel may be less than a frequency of the second channel. The first channel may be a low frequency channel, and the low frequency channel may be, for example, a 2.4 gigahertz (GHz) channel or a 5.8 GHz channel. Certainly, the low frequency channel may alternatively be another low frequency channel. The foregoing description is merely an example. This is not limited in this application.

The second channel may be a high frequency channel, and the high frequency channel may be, for example, a millimeter-wave channel such as a 60 GHz channel. Certainly, the high frequency channel may alternatively be a channel of another frequency. The foregoing description is merely an example. This is not limited in this application. A bandwidth of the second channel may be greater than or equal to a preset channel bandwidth, and the preset channel bandwidth may be a single-channel bandwidth on the high frequency channel, and the bandwidth of the second channel may be, for example, a single-channel bandwidth on the high frequency channel, or may be an integer multiple such as two times of a single-channel bandwidth on the high frequency channel.

If the communication method is applicable to a single-mode communication mode, the first channel and the second channel are two different high frequency channels.

It is assumed that both the first channel and the second channel are high frequency channels. In S401, the sending node may send the first frame to the receiving node in a quasi-omni sending manner. In S402, the sending node may send the at least one second frame to the receiving node in a directional sending manner. In S403, the receiving node may receive, in a quasi-omni receiving manner, the first frame sent by the sending node. In S404, the receiving node may receive, in a directional receiving manner, the at least one second frame sent by the sending node.

Therefore, regardless of the dual-mode communication mode or the single-mode communication mode, the second channel may be a high frequency channel.

Each second frame sent on the second channel may correspond to one sending direction, and the sending direction may be a sending direction corresponding to a transmit sector or a transmit beam. Different second frames in the at least one second frame may correspond to different sending directions. Therefore, the at least one second frame may be used for BF training. After receiving the at least one second frame, the receiving node may train a sending direction of the sending node based on the at least one second frame, to determine an optimal sending direction of the sending node. This implements sending direction-based BF training.

The preset frame length may be a conventional frame length, namely, a length of a frame on the second channel in an existing communications standard. In other words, the preset frame length may be a length of a frame sent by the sending node on the second channel in each direction before the first channel is used for sharing and coordination.

Optionally, the foregoing first frame may include some to-be-transmitted information on the second channel; and the second frame includes remaining to-be-transmitted information on the second channel.

The some to-be-transmitted information on the second channel that is included in the first frame and the remaining to-be-transmitted information on the second channel that is included in the second frame may constitute complete to-be-transmitted information on the second channel. The complete to-be-transmitted information may be to-be-transmitted information in a conventional communications standard that is included in a frame, on the second channel, that corresponds to one sending direction.

Optionally, the first frame may include to-be-transmitted information on the first channel and/or to-be-transmitted information on the second channel.

In other words, the first frame may include only the to-be-transmitted information on the first channel, or may include only the to-be-transmitted information on the second channel, or may include both the to-be-transmitted information on the first channel and the to-be-transmitted information on the second channel. The to-be-transmitted information that is on the second channel and that is included in the first frame may be complete to-be-transmitted information on the second channel or some to-be-transmitted information on the second channel. The some to-be-transmitted information on the second channel may be a part of the complete to-be-transmitted information. The complete to-be-transmitted information may be to-be-transmitted information in a conventional communications standard that is included in a frame, on the second channel, that corresponds to one sending direction.

If the first frame includes the to-be-transmitted information on the second channel, the second frame may not include the to-be-transmitted information on the second channel.

In other words, in the communication method, the to-be-transmitted information on the second channel may be carried in the first frame, and the first frame is sent to the receiving node on the first channel. This reduces an amount of information included in each second frame, and shortens the length of each second frame.

In an example of the dual-mode communication mode, the first channel is a low frequency channel, the second channel is a high frequency channel, and the first frame is a beacon frame, namely, a low frequency beacon frame. In this case, the low frequency beacon frame includes information included in a beacon frame to be transmitted on a high frequency channel in the 802.11ad standard and/or the 802.11ay standard. Alternatively, the low frequency beacon frame includes information included in a beacon frame to be transmitted on a low frequency channel in the 802.11n standard and/or the 802.11ac standard and/or the 802.11ax standard, and information included in a beacon frame to be transmitted on a high frequency channel in the 802.11ad standard and/or the 802.11ay standard.

Optionally, a conventional transmission frame such as a data frame or a signaling frame may usually include a physical header, a MAC header, and a load part. The second frame in this embodiment of this application may not include a MAC header and/or a load part. In other words, the second frame may include a physical header, or include a physical header and a MAC header, or include a physical header and a load part. Therefore, the length of each second frame may be less than the preset frame length.

It should be noted that S401 and S402 may be simultaneously performed, or may be successively performed. This is not limited in this application. In other words, after sending the first frame, the sending node may send the at least one second frame to the receiving node on the second channel. Alternatively, the sending node may first send the at least one second frame to the receiving node on the second channel, and send the first frame to the receiving node on the first channel after sending the second frame. Alternatively, the sending node may simultaneously send the first frame on the first channel, and send the at least one second frame on the second channel.

S403 and S404 may be simultaneously performed, or may be successively performed. This is not limited in this application. In other words, after receiving the first frame, the receiving node may receive, on the second channel, the at least one second frame sent by the sending node. Alternatively, the receiving node may first receive, on the second channel, the at least one second frame sent by the sending node, and after receiving the second frame, receive, on the first channel, the first frame sent by the sending node. Alternatively, the receiving node may simultaneously receive the first frame on the first channel, and receive the at least one second frame on the second channel.

In the communication method provided in this embodiment of this application, the sending node may send the first frame to the receiving node on the first channel, and send the at least one second frame to the receiving node on the second channel. Each second frame corresponds to one sending direction, and the length of each second frame may be less than the preset frame length. In the communication method, coordinated communication is performed on channels of different frequencies to send information to the receiving node, the at least one second frame corresponding to a sending direction is sent on the second channel of a higher frequency, and the first frame is sent on the first channel of a lower frequency. Due to sharing and coordination of the first channel, the length of the second frame transmitted on the second channel is less than the preset frame length. Therefore, duration for which beamforming training is performed on the second channel can be reduced, and overall network communication efficiency and a network throughput can be improved.

In addition, in the communication method, the first channel has a relatively low frequency, relatively low signal attenuation, and a relatively small path loss. Therefore, to-be-transmitted information on the second channel is carried in the first frame sent on the first channel such that information transmission robustness can be effectively improved, and network performance can be improved.

Optionally, in the communication method, the sending node needs to send the first frame on the first channel.

Therefore, before sending the first frame, the sending node needs to first perform CCA on the first channel to determine whether the first channel is clear. If the first channel is clear, the sending node sends the first frame on the first channel.

Because the sending node further sends the at least one second frame on the second channel, the sending node further needs to first perform CCA on the second channel to determine whether the second channel is clear. If the second channel is clear, the sending node sends the at least one second frame on the second channel.

Optionally, the first frame may include an identifier of a sending direction corresponding to the at least one second frame.

Optionally, each second frame may also include an identifier of a sending direction corresponding to each second frame.

The identifier of the sending direction corresponding to each second frame may include at least one of the following such as an identifier of a transmit antenna corresponding to each second frame, an identifier of a transmit sector, an identifier of a transmit beam, countdown information, and the like.

In the communication method, the identifier of the sending direction corresponding to the at least one second frame may be carried in the first frame, and the first frame is sent to the receiving node on the first channel, to enumerate identifiers of sending directions for the receiving node such that the receiving node performs beamforming training.

Optionally, in the foregoing method, the sending node sends at least one second frame to the receiving node on a second channel in S402 that may include sending, by the sending node, at least one second frame to the receiving node on the second channel after a preset time interval starting from a moment at which sending of the first frame ends.

For the receiving node, at least one second frame is sent by the sending node after the preset time interval starting from the moment at which sending of the first frame ends.

Further, the preset time interval may be a preset interframe space (X InterFrame Space, XIFS) such as a short interframe space (SIFS). The preset time interval may alternatively be another time interval such as another time interval greater than the SIFS. The preset time interval may alternatively be a time interval indicated by received signaling.

The sending node sends the at least one second frame after the preset time interval starting from the moment at which sending of the first frame ends such that the receiving node can accurately identify the second frame sent on the second channel.

Optionally, the communication method may further include, when the sending node sends the first frame to the receiving node on the first channel, further sending, by the sending node, a third frame to the receiving node on the second channel, where the third frame includes one first frame and one second frame, or one second frame and a training (TRN) sequence.

For the receiving node, before the receiving node receives, on the second channel, the at least one second frame sent by the sending node in S404, the method may further include receiving, by the receiving node on the first channel, a third frame sent by the sending node, where the third frame is sent when the sending node sends the first frame to the receiving node on the first channel.

Further, when determining that both the first channel and the second channel are clear, the sending node may send the first frame to the receiving node on the first channel, and may further send the third frame to the receiving node on the second channel. In this way, the first channel and the second channel can be occupied, to avoid a conflict caused because the first channel and the second channel are preempted by other nodes.

A frame length of the third frame may be equal to a time length of the first frame.

In an implementation, the third frame may, for example, include the second frame and padding information. A length of the padding information may be determined based on a difference between a frame length of the first frame and a frame length of the second frame.

The padding information may be physical padding (PHY padding) information, or may be MAC padding information such as end of frame padding (EOF padding) information.

In another implementation, the third frame may, for example, include the second frame and a training sequence. A length of the training sequence may be determined based on a difference between a frame length of the first frame and a frame length of the second frame.

In some other implementations, a frame length of the third frame may not be equal to a time length of the first frame, for example, may be greater than or less than the time length of the first frame. This is not limited in this application.

In some other implementations, the third frame may not include the second frame, and a type of the third frame is the same as a type of the first frame. For example, if the first frame is a beacon frame, the third frame may also be a beacon frame.

Optionally, the first frame may include first indication information, and the first indication information is used to indicate communication capabilities of the sending node on the first channel and the second channel.

Correspondingly, the method may further include determining, by the receiving node, communication capabilities of the sending node on the first channel and the second channel based on the first indication information.

Further, because the first channel and the second channel are channels of different frequencies, the communication capabilities on the first channel and the second channel may also be referred as a dual-mode communication capability. Therefore, the first indication information may also be referred as dual-mode capability indication information.

The first indication information may be located in at least one preset bit in the first frame. The at least one preset bit may be located at any location such as a reserved bit in an information element (IE) in an existing communications standard in the first frame, a newly added IE in the first frame, or an extensible IE in the first frame.

The first frame corresponds to different communications standards, and the first indication information is located at different locations in the first frame.

A location of the first indication information in the first frame is described below using a plurality of instances.

In an example, the first indication information may be located in a reserved bit in a supported very high throughput-modulation and coding scheme and number of spatial streams set field in a very high throughput capability element in the first frame.

For example, FIG. 5 is a schematic structural diagram of a high throughput capability element according to an embodiment of this application. FIG. 6 is a schematic structural diagram of a supported high throughout-modulation and coding scheme and number of spatial streams set field in a high throughput capability element according to an embodiment of this application.

It can be learned from FIG. 5 that the high throughput capability element may include a 1-byte element identifier (Element ID) field, a 1-byte length (Length) field, a 4-byte high throughput capability information (Very High Throughout Capability info) field, and an 8-byte supported high throughput-modulation and coding scheme and number of spatial streams set field.

It can be learned from FIG. 6 that the supported high throughput-modulation and coding scheme and number of spatial streams set field may include a 16-bit receive very high throughput-modulation and coding scheme map (Rx VHT-MCS Map) field, a 13-bit receive highest supported long guard interval data rate (Rx Highest Supported Long Guard Interval Data Rate) field, a 3-bit maximum number of total space-time streams (maximum Number of total Space-Time Streams) field, a 16-bit transmit high throughput-modulation and coding scheme map (Tx VHT-MCS Map) field, a 13-bit transmit highest supported long guard interval data rate (Tx Highest Supported Long Guard Interval Data Rate) field, a 1-bit high throughput extended number of spatial streams bandwidth capable (VHT Extended NSS BW Capable) field, and a 2-bit reserved field.

For example, the first indication information may be located in at least one bit in the reserved field in FIG. 6, namely, at least one of a bit (B) 62 and a bit 63.

In another example, the first indication information may be located in a reserved bit in a high efficient media access control capability information field or a high efficient physical capability information field (High Efficient PHY Capability Information field) in a high efficient capability element (High Efficient Capability Element) in the first frame.

For example, FIG. 7 is a schematic structural diagram of a high efficient capability element according to an embodiment of this application. FIG. 8 is a schematic structural diagram of a high efficient media access control layer capability information field in a high efficient capability element according to an embodiment of this application.

It can be learned from FIG. 7 that the high efficient capability element may include a 1-byte element identifier field, a 1-byte length field, a 5-byte high efficient media access control capability information field, a 9-byte high efficient physical capability information field, a transmit or receive high efficient modulation and coding scheme and number of spatial streams support (Tx Rx HE MCS NSS Support) field that includes at least two bytes, and a physical padding extension threshold field that includes a variable quantity of bytes.

It can be learned from FIG. 8 that the high efficient media access control layer capability information field may include a 1-bit high throughput control high efficient support (High Throughput Control HE Support) field, a 1-bit target wake time requester support field, a 1-bit target wake time responder support field, a 2-bit fragmentation support field, a 3-bit maximum number of fragmented MAC service data units field, a 2-bit minimum fragment size field, a 2-bit trigger frame MAC padding duration field, a 3-bit multi-tunnel identifier aggregation support (Multi-Tunnel ID Aggregation Support) field, a 2-bit high efficient link adaptation (HE Link Adaptation) field, a 1-bit all acknowledgement support (All ACK Support) field, a 1-bit uplink multi-user responder scheduling support (UL MU Responder Scheduling Support) field, a 1-bit aggregate buffer status report support (A-BSR Support) field, a 1-bit broadcast target wake time support (Broadcast TWT Support) field, a 32-bit block response bitmap support (32-bit BA Bitmap Support) field that includes 1 bit, a 1-bit multi-user cascade support (MU Cascade Support) field, a 1-bit response-enabled multi-tunnel identifier aggregation support (ACK-Enabled Multi-Tunnel ID Aggregation Support) field, a 4-bit group addressed multi-station block response in downlink multi-user support (Group Addressed Multi-STA Block Ack in DL MU Support) field, a 1-bit operating mode indication aggregate control support (Operating Mode Indication A-Control Support) field, a 1-bit orthogonal frequency division multiple access receiver address support (OFDMA RA Support) field, a 2-bit maximum aggregate MAC protocol data unit length support (maximum A-MPDU Length Exponent) field, a 1-bit downlink multi-user multiple-input multiple-output on partial bandwidth receive (DL MU-MIMO on Partial Bandwidth Rx) field, a 2-bit uplink multi-user multiple-input multiple-output (UL MU-MIMO) field, and an 8-bit reserved field.

For example, the first indication information may be located in at least one bit in the reserved field in FIG. 8, namely, at least one of a bit 32 to a bit 39.

In still another example, the first indication information may be located in a reserved bit in a directional multi-gigabit station capability information field (Directional Multi-Gigabit STA Capability Information field) or a directional multi-gigabit access point or basic service set control point capability information field (Directional Multi-Gigabit AP or PCP Capability Information field) in a directional multi-gigabit capability element (Directional Multi-Gigabit Capability Element) in the first frame.

Figure 11:
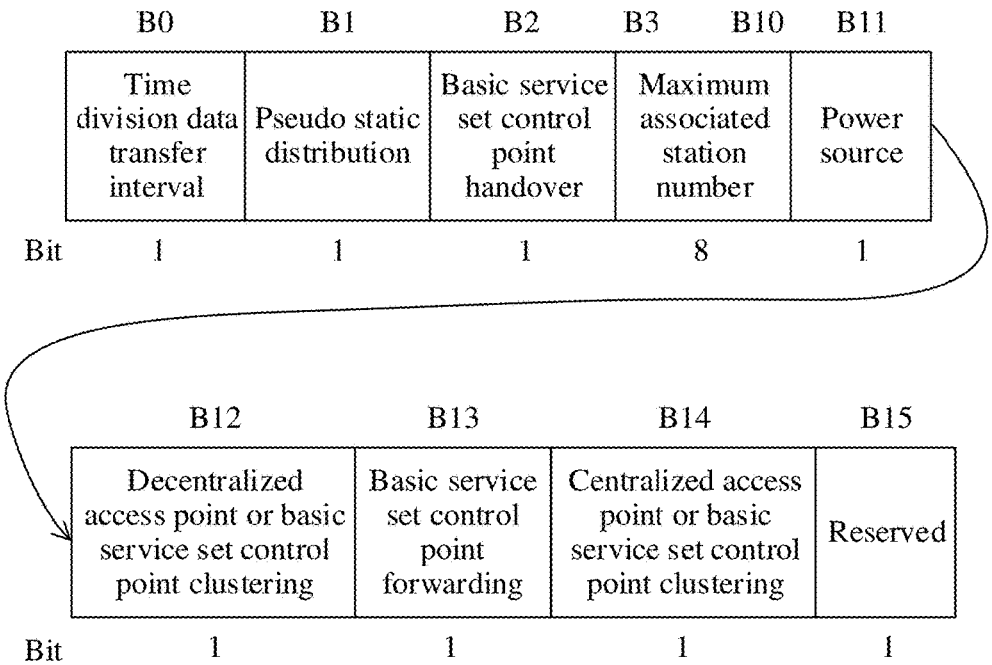
FIG. 11 is a schematic structural diagram of a directional multi-gigabit access point or personal basic service set control point capability information field in a directional multi-gigabit capability element according to an embodiment of this application.

For example, FIG. 9 is a schematic structural diagram of a directional multi-gigabit capability element according to an embodiment of this application. FIG. 10 is a schematic structural diagram of a directional multi-gigabit station capability information field in a directional multi-gigabit capability element according to an embodiment of this application. FIG. 11 is a schematic structural diagram of a directional multi-gigabit access point or basic service set control point capability information field in a directional multi-gigabit capability element according to an embodiment of this application.

It can be learned from FIG. 9 that the directional multi-gigabit capability element includes a 1-byte element identifier field, a 1-byte length field, a 6-byte station address (STA Address) field, a 1-byte associated identifier (AID) field, an 8-byte directional multi-gigabit station capability information field, a 2-byte directional multi-gigabit access point or basic service set control point capability information field, a 2-byte directional multi-gigabit station beam tracking time limit (Directional Multi-Gigabit STA Beam Tracking Time Limit) field, a 1-byte extended single carrier modulation and coding scheme capability (Extended SC MCS Capability) field, a 1-byte maximum number of basic aggregate MAC service data unit subframes in an aggregate MAC service data unit (maximum number of Basic A-MSDU Subframes in A-MSDU) field, and a 1-byte maximum number of short aggregate MAC service data unit subframes in an aggregate MAC service data unit (Maximum number of Short A-MSDU Subframes in A-MSDU) field.

It can be learned from FIG. 10 that the directional multi-gigabit station capability information field may include a 1-bit reverse direction field, a 1-bit higher layer timer synchronization (High layer Timer Synchronization) field, a 1-bit transmission power control field, a 1-bit spatial sharing with interference mitigation field, a 2-bit number of receive directional multi-gigabit antennas (Number of Rx DMG Antennas) field, a 1-bit fast link adaptation field, a 7-bit total number of sectors field, a 6-bit receive sector sweep length (RXSS Length) field, a 1-bit directional multi-gigabit antenna reciprocity (DMG Antenna Reciprocity) field, a 6-bit aggregate MAC protocol data unit parameter (A-MPDU Parameter) field, a 1-bit block response with flow control (BA With Flow Control) field, a 24-bit supported modulation and coding scheme set (Supported MCS Set) field, a 1-bit dynamic trunking protocol supported field, a 1-bit aggregate physical protocol data unit supported (A-PPDU Supported) field, a 1-bit heartbeat (Heartbeat) field, a 1-bit supported other associated identifier (Supported Other-AID) field, a 1-bit antenna pattern reciprocity (Antenna Pattern Reciprocity) field, a 3-bit heartbeat elapsed indication field, a 1-bit grant response supported (Grant ACK Supported) field, a 1-bit receive sector sweep transmit rate supported (RXSS Tx Rate Supported) field, and a 2-bit reserved field.

For example, the first indication information may be located in at least one bit in the reserved field in FIG. 10, namely, at least one of a bit 62 and a bit 63.

It can be learned from FIG. 11 that the directional multi-gigabit access point or basic service set control point capability information field may include a 1-bit time division data transfer interval (TDDTI) field, a 1-bit pseudo static allocation field, a 1-bit basic service set control point handover (Personal Basic Service Set Control Point Handover, PCP Handover) field, an 8-bit maximum associated station number (MAX Associated STA Number) field, a 1-bit power source field, a 1-bit decentralized access point or basic service set control point clustering (Decentralized AP or PCP Clustering) field, a 1-bit basic service set control point forwarding (PCP Forwarding) field, a 1-bit centralized access point or basic service set control point clustering (Centralized AP or PCP Clustering) field, and a 1-bit reserved field.

For example, the first indication information may be located in a bit in the reserved field in FIG. 11, namely, a bit 15.

In yet another example, the first indication information may be located in a reserved bit in a core capability field or a physical capability field (PHY Capability field) in an enhanced directional multi-gigabit capability element in the first frame.

Figure 12:
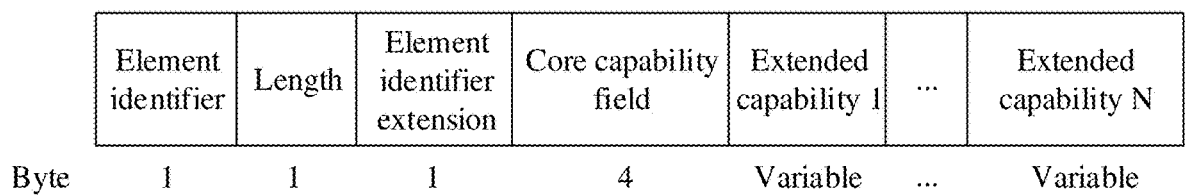
FIG. 12 is a schematic structural diagram of an enhanced directional multi-gigabit capability element according to an embodiment of this application.
Figure 13:
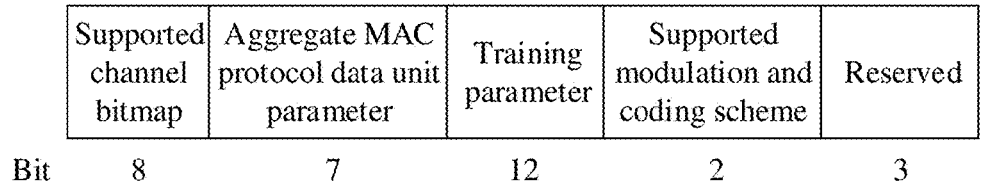
FIG. 13 is a schematic structural diagram of a core capability field in an enhanced directional multi-gigabit capability element according to an embodiment of this application.
Figure 14:
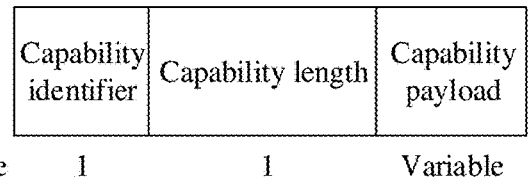
FIG. 14 is a schematic structural diagram of an extended capability field in an enhanced directional multi-gigabit capability element according to an embodiment of this application.
Figure 15:
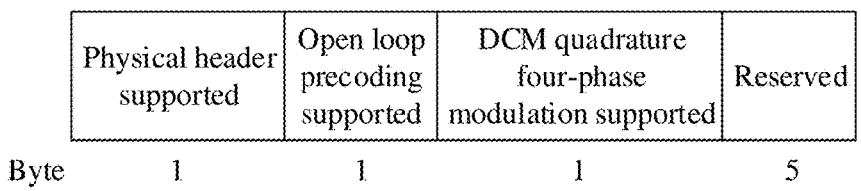
FIG. 15 is a schematic structural diagram of a physical capability field in an enhanced directional multi-gigabit capability element according to an embodiment of this application.

For example, FIG. 12 is a schematic structural diagram of an enhanced directional multi-gigabit capability element according to an embodiment of this application. FIG. 13 is a schematic structural diagram of a core capability field in an enhanced directional multi-gigabit capability element according to an embodiment of this application. FIG. 14 is a schematic structural diagram of an extended capability field in an enhanced directional multi-gigabit capability element according to an embodiment of this application. FIG. 15 is a schematic structural diagram of a physical capability field in an enhanced directional multi-gigabit capability element according to an embodiment of this application.

It can be learned from FIG. 12 that the enhanced directional multi-gigabit capability element may include a 1-byte element identifier field, a 1-byte length field, a 1-byte element identifier extension (Element ID Extension) field, a 4-byte core capability field, and N extended capability fields that each include a variable quantity of bytes.

It can be learned from FIG. 13 that the core capability field may include an 8-bit supported channel bitmap field, a 7-bit aggregate MAC protocol data unit parameter (A-MPDU Parameters) field, a 12-bit training parameter (TRN Parameters) field, a 2-bit supported modulation and coding scheme (Supported MCS) field, and a 3-bit reserved field.

For example, the first indication information may be located in at least one bit in the reserved field in FIG. 13, namely, at least one of a bit 29 to a bit 31.

It can be learned from FIG. 14 that the extended capability field may include a 1-byte capability identifier (Capability ID) field, a 1-byte capability length field, and a capability payload field that includes a variable quantity of bytes.

Capability payload fields in extended capability fields of different capability identifiers include different capabilities. For a correspondence between a capability identifier and a capability, refer to Table 1 below.

TABLE 1

| Capability | Capability identifier |
| --- | --- |
| Beamforming | 0 |
| Multi-beamforming | 1 |
| Antenna polarization capability | 2 |
| Physical capability | 3 |

It can be learned from Table 1 that if the capability identifier is 0, the capability payload field in the extended capability field may include a beamforming capability; if the capability identifier is 1, the capability payload field in the extended capability field may include a multi-beamforming (Multi-BF) capability; if the capability identifier is 2, the capability payload field in the extended capability field may include an antenna polarization capability; and if the capability identifier is 3, the capability payload field in the extended capability field may include a physical capability (PHY Capability).

When the capability identifier is 3, the capability payload field in the extended capability field may be used as a physical capability field.

It can be learned from FIG. 15 that the physical capability field may include a 1-bit physical header supported (PH Supported) field, a 1-bit open loop precoding supported field, a 1-bit dual carrier modulation quadrature four-phase modulation supported (Dual Carrier Modulation SQPSK Supported) field, and a 5-bit reserved field.

For example, the first indication information may be located in at least one bit in the reserved field in FIG. 15, namely, at least one of a bit 3 to a bit 7.

Certainly, the first indication information may alternatively be located in an extendable field in a newly added field in a capability element with a frequency of 60 GHz (FG60) Capability Element in the first frame.

The first indication information may alternatively be located at another location in the first frame. The foregoing description is merely an example for description. This is not limited in this application.

Optionally, the first frame may further include address indication information, and the address indication information is used to indicate an address of each of a processing module corresponding to a first channel and a processing module corresponding to a second channel that are in the sending node. The address may include a MAC address and an AID. The processing module corresponding to the first channel may be referred to as a low frequency module, and the processing module corresponding to the second channel may be referred to as a high frequency module.

For example, if the sending node is a network device, in an implementation, the processing module corresponding to the first channel and the processing module corresponding to the second channel may have different MAC addresses and have a same basic service set associated identifier (Basic Service Set Associated ID, BSS AID). In another implementation, the processing module corresponding to the first channel and the processing module corresponding to the second channel may have different MAC addresses and have different BSS AIDs. For example, in the processing module corresponding to the first channel and the processing module corresponding to the second channel, a BSS AID of one processing module may be an odd number, and a BSS AID of the other processing module may be an even number. There is a preset correspondence between the BSS AID of the processing module corresponding to the first channel and the BSS AID of the processing module corresponding to the second channel. The network device may be an AP or a PCP in a wireless local area network, or may be a gNodeB (gNB) in a 5G mobile communications network. For example, a sum of the BSS AID of the processing module corresponding to the first channel and the BSS AID of the processing module corresponding to the second channel may be a preset fixed value. Alternatively, a difference between the BSS AID of the processing module corresponding to the first channel and the BSS AID of the processing module corresponding to the second channel may be a preset fixed value. In still another possible implementation, the processing module corresponding to the first channel and the processing module corresponding to the second channel may have a same MAC address.

If the sending node is user equipment, in an implementation, the processing module corresponding to the first channel and the processing module corresponding to the second channel may have different MAC addresses and have a same AID. In another implementation, the processing module corresponding to the first channel and the processing module corresponding to the second channel may have different MAC addresses and have different AIDs. For example, in the processing module corresponding to the first channel and the processing module corresponding to the second channel, an AID of one processing module may be an odd number, and an AID of the other processing module may be an even number. There is a preset correspondence between the AID of the processing module corresponding to the first channel and the AID of the processing module corresponding to the second channel. For example, a sum of the AID of the processing module corresponding to the first channel and the AID of the processing module corresponding to the second channel may be a preset fixed value. Certainly, alternatively, a difference between the AID of the processing module corresponding to the first channel and the AID of the processing module corresponding to the second channel may be a preset fixed value. In still another possible implementation, the processing module corresponding to the first channel and the processing module corresponding to the second channel may have a same MAC address.

Optionally, the first frame further includes second indication information, and the second indication information is used to indicate whether the second frame is sent on the second channel in a current transmission period.

Correspondingly, the method may further include determining, by the receiving node based on the second indication information, whether the second frame is sent on the second channel in a current transmission period.

Further, the second indication information may be located in at least one bit in the first frame. The at least one bit may be located at any location such as a reserved field in the first frame, a physical header (PHY header) in the first frame, a newly added IE in the first frame, or an extensible IE in the first frame.

Optionally, the first frame further includes third indication information, and the third indication information is used to indicate a sending start time of the second frame in the current transmission period or a relative time interval between the sending start time and a preset time.

Correspondingly, the method may further include determining, by the receiving node, a sending start time of the second frame in the current transmission period or a relative time interval between the sending start time and a preset time based on the third indication information.

Further, the third indication information may be used to indicate a sending start time of the $1^{st}$ second frame on the second channel in the current transmission period or a relative time interval between the sending start time and a preset time. The preset time may be any one of a sending start time of the first frame, a sending end time of the first frame, and the like.

The third indication information may be located in at least one bit in the first frame. The at least one bit may be located at any location such as a reserved field in the first frame, a physical header (PHY header) in the first frame, a newly added IE in the first frame, or an extensible IE in the first frame.

Optionally, the first frame shown above further includes fourth indication information, and the fourth indication information is used to indicate whether the first frame is sent on the first channel and the at least one second frame is sent on the second channel, in a transmission period after the current transmission period.

Correspondingly, the method may further include determining, by the receiving node based on the fourth indication information, whether the first frame is sent on the first channel and the at least one second frame is sent on the second channel, in a transmission period after the current transmission period.

Further, the transmission period after the current transmission period may include N transmission periods after the current transmission period, where N may be any positive integer greater than or equal to 1.

The fourth indication information is used to indicate frame sending statuses on the first channel and the second channel, and the first channel and the second channel are channels of different frequencies. Therefore, the fourth indication information may also be referred to as frame indication information on high and low frequency channels in a subsequent transmission period.

The fourth indication information may be located in at least one bit in the first frame. The at least one bit may be located at any location such as a next low frequency and high frequency mix beacon field (Next LF and HF mix Beacon field) in the first frame, a newly added IE in the first frame, or an extensible IE in the first frame.

Optionally, the first frame further includes fifth indication information, and the fifth indication information is used to indicate a sending time of the first frame and/or the second frame in the transmission period after the current transmission period, a relative time interval between the sending time of the first frame and/or the second frame in the transmission period after the current transmission period and a preset time in the current transmission period, or an identifier of the transmission period that is after the current transmission period and in which the first frame and/or the first frame are/is located.

Correspondingly, the method further includes determining, by the receiving node based on the fifth indication information, a sending time of the first frame in the transmission period after the current transmission period, a relative time interval between the sending time of the first frame in the transmission period after the current transmission period and a preset time in the current transmission period, or an identifier of the transmission period that is after the current transmission period and in which the first frame is located.

Further, the transmission period after the current transmission period may include N transmission periods after the current transmission period, where N may be any positive integer greater than or equal to 1.

The fifth indication information may also be located in at least one bit in the first frame. The at least one bit may be located at any location such as a next low frequency and high frequency mix beacon field (Next LF and HF mix Beacon field) in the first frame, a newly added IE in the first frame, or an extensible IE in the first frame.

Optionally, if the communication method is applied to a WLAN system, in a BTI, the first frame shown above may include a beacon frame, and the second frame includes any one of the following, such as, a NDP frame, a SSSW frame, a Qos Non frame, a short beacon frame, a frame including only a physical layer header, or another frame.

Figure 16:
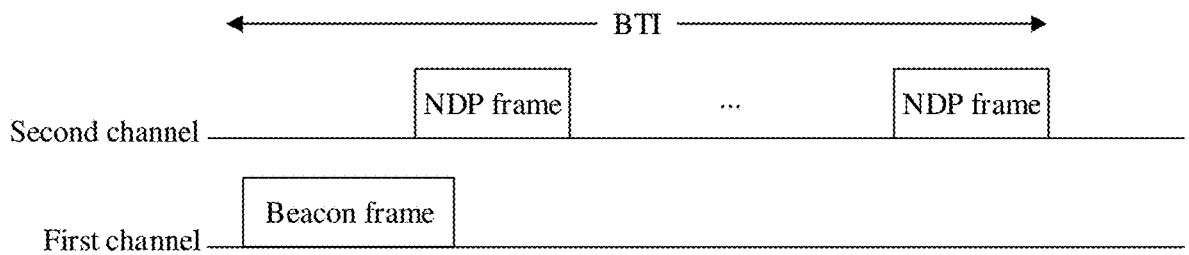
FIG. 16 is a schematic diagram of frame transmission on a first channel and a second channel in a BTI in a communication method according to an embodiment of this application.
Figure 17:
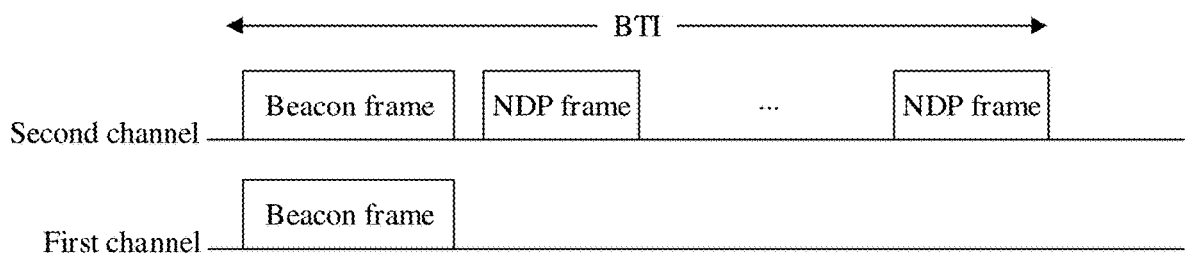
FIG. 17 is a schematic diagram of another frame transmission on a first channel and a second channel in a BTI in a communication method according to an embodiment of this application.

In the BTI, an example in which the first frame is the beacon frame and the second frame is the NDP frame is used below for description. FIG. 16 is a schematic diagram of frame transmission on a first channel and a second channel in a BTI in a communication method according to an embodiment of this application. FIG. 17 is a schematic diagram of another frame transmission on a first channel and a second channel in a BTI in a communication method according to an embodiment of this application. The first channel may be a low frequency channel, and the second channel may be a high frequency channel. In the communication method, if the first channel is the low frequency channel, and the second channel is the high frequency channel, the BTI shown in FIG. 16 and FIG. 17 may be referred to as a BTI with low frequency channel assistance. It should be noted that the first channel and the second channel that are shown in FIG. 16 or FIG. 17 may alternatively be two different high frequency channels.

It can be learned from FIG. 16 that in the BTI, an AP or a PCP may serve as a sending node to send a beacon frame to a station on the first channel, and to send at least one NDP frame to the station on the second channel after a preset time interval starting from a moment at which the beacon frame is sent. If the first channel is a low frequency channel, and the second channel is a high frequency channel, the beacon frame sent on the first channel may be referred to as an LF beacon frame, and each NDP frame sent on the second channel may be referred to as an HF NDP frame. Each NDP frame sent on the second channel may correspond to one sending direction. The beacon frame sent on the first channel may include identifiers of sending directions corresponding to all NDP frames.

It can be learned from FIG. 17 that in the BTI, an AP or a PCP may serve as a sending node to send a beacon frame to a station on the first channel, and the AP or the PCP also sends a beacon frame on the second channel. The AP or the PCP further sends at least one NDP frame to the station on the second channel after a preset time interval starting from a moment at which the beacon frame is sent on the first channel. If the first channel is a low frequency channel, and the second channel is a high frequency channel, the beacon frame sent on the first channel may be referred to as an LF beacon frame, the beacon frame sent on the second channel may be referred to as an HF beacon frame, and each NDP frame sent on the second channel may be referred to as an HF NDP frame. A length of the beacon frame on the first channel may be equal to a length of the beacon frame on the second channel. Certainly, the length of the beacon frame on the first channel may not be equal to the length of the beacon frame on the second channel. The foregoing description is merely an example for description. This is not limited in this application.

Each NDP frame sent on the second channel may correspond to one sending direction. Each NDP frame includes an identifier of the sending direction corresponding to each NDP frame, and the identifier of the sending direction corresponding to each NDP frame includes at least one of the following information, for example, countdown (COWN) information, an antenna identifier (Antenna ID), a sector identifier (Sector ID), and the like.

The beacon frame sent on the first channel may include identifiers of sending directions corresponding to some or all NDP frames.

In FIG. 17, the beacon frame sent on the second channel may alternatively be replaced with an NDP frame and a training sequence, and the training sequence may also correspond to one or more sending and/or receiving directions, to increase a quantity of sector sweep directions, and reduce a sweep time.

In FIG. 16 and FIG. 17, the beacon frame sent on the first channel may further include first indication information, to indicate communication capabilities of the AP or the PCP on the first channel and the second channel.

In FIG. 16 and FIG. 17, the beacon frame sent on the first channel may further include second indication information, to indicate whether the NDP frame is sent on the second channel in a current transmission period after the beacon frame is sent.

In FIG. 16 and FIG. 17, the beacon frame sent on the first channel may further include third indication information, to indicate a sending start time of the $1^{st}$ NDP frame on the second channel in the current transmission period or a relative time interval between the sending start time and a preset time.

In FIG. 16 and FIG. 17, the beacon frame sent on the first channel may further include fourth indication information, to indicate whether the beacon frame is sent on the first channel and the at least one NDP frame is sent on the second channel, in a transmission period after the current transmission period.

In FIG. 16 and FIG. 17, the NDP frame may be a DMG NDP frame, an enhanced directional multi-gigabit (EDMG) NDP frame, or an FG60 NDP frame.

Figure 18:
FIG. 18 is a schematic structural diagram of a directional multi-gigabit (DMG) NDP frame in a communication method according to an embodiment of this application.

The NDP frame is briefly described below with reference to an instance. FIG. 18 is a schematic structural diagram of a DMG NDP frame in a communication method according to an embodiment of this application. FIG. 19 is a schematic structural diagram of an EDMG NDP frame in a communication method according to an embodiment of this application. FIG. 20 is a schematic structural diagram of an FG60 NDP frame in a communication method according to an embodiment of this application.

As shown in FIG. 18, the DMG NDP frame may include a short training field ((STF) field, a channel estimation field (CEF), and a header block field. If the NDP frame sent on the second channel is the DMG NDP frame, information carried in the NDP frame, for example, information such as COWN information, an antenna identifier, and a sector identifier, may be, for example, located in a header block field in the DMG NDP frame.

As shown in FIG. 19, the EDMG NDP frame may include a legacy short training field (L-STF), a legacy short training field (Legacy-Channel Estimation Field, L-CEF), a legacy header (Legacy-Header) field, an EDMG header A (EDMG Header-A) field, an EDMG-STF field, an EDMG-CEF field, and an EDMG header B (EDMG Header-B) field. If the NDP frame sent on the second channel is the EDMG NDP frame, information carried in the NDP frame, for example, information such as COWN information, an antenna identifier, and a sector identifier, may be, for example, located in any one of a long header field, an EDMG header A field, or an EDMG header B field in the EDMG NDP frame. It should be noted that the EDMG NDP frame may not include the EDMG header B field. FIG. 19 merely shows a possible example of the EDMG NDP frame. This is not limited in this embodiment of this application.

As shown in FIG. 20, the FG60 NDP frame may include an L-STF, an L-CEF, a legacy header field, a future directional multi-gigabit header A (Future DMG Header-A) field, an FDMG-STF field, an FDMG-CEF field, and an FDMG header B (FDMG Header-B) field. If the NDP frame sent on the second channel is the FG60 NDP frame, information carried in the NDP frame, for example, information such as COWN information, an antenna identifier, and a sector identifier, may be, for example, located in any one of a long header field, an FDMG header A field, or an FDMG header B field in the FG60 NDP frame. It should be noted that the FG60 NDP frame may not include the FDMG header B field. FIG. 20 merely shows a possible example of the FG60 NDP frame. This is not limited in this embodiment of this application.

Certainly, the information such as the COWN information, the antenna identifier, and the sector identifier may alternatively be other signaling located on the second channel, for example, control tail (control tail) signaling or another frame on the second channel, such as a short beacon frame.

Optionally, if the communication method is applied to a WLAN system, in a sector sweep phase, the sector sweep phase may be within an association beamforming training (A-BFT) period or a data transfer interval (DTI); and the first frame may include a sector sweep (SSW) frame or an SSSW frame, and the second frame includes an NDP frame or a frame including only a physical layer header.

In the A-BFT period, an example in which the first frame is the SSW frame and the second frame is the NDP frame is used below for description. FIG. 21, FIG. 22, and FIG. 23 are described using an A-BFT period as an example. FIG. 21 is a schematic diagram of frame transmission on a first channel and a second channel in A-BFT in a communication method according to an embodiment of this application. FIG. 22 is a schematic diagram of another frame transmission on a first channel and a second channel in A-BFT in a communication method according to an embodiment of this application. The first channel may be a low frequency channel, and the second channel may be a high frequency channel. In the communication method, if the first channel is the low frequency channel, and the second channel is the high frequency channel, the A-BFT shown in FIG. 21 and FIG. 22 may be referred to as A-BFT with low frequency channel assistance. It should be noted that the first channel and the second channel that are shown in FIG. 21 and FIG. 22 may alternatively be two different high frequency channels.

It can be learned from FIG. 21 that in the A-BFT, a station may serve as a sending node to send an SSW frame to an AP or a PCP on the first channel, and to send at least one NDP frame to the AP or the PCP on the second channel after a preset time interval starting from a moment at which the SSW frame is sent. If the first channel is a low frequency channel, and the second channel is a high frequency channel, the SSW frame sent on the first channel may be referred to as an LF SSW frame, and each NDP frame sent on the second channel may be referred to as an HF NDP frame. Each NDP frame sent on the second channel may correspond to one sending direction. The SSW frame sent on the first channel may include identifiers of sending directions corresponding to all NDP frames.

It can be learned from FIG. 22 that in the A-BFT, a station may serve as a sending node to send an SSW frame to an AP or a PCP on the first channel, and the station also sends an SSW frame on the second channel. The station further sends at least one NDP frame to the AP or the PCP on the second channel after a preset time interval starting from a moment at which the SSW frame is sent on the first channel. If the first channel is a low frequency channel, and the second channel is a high frequency channel, the SSW frame sent on the first channel may be referred to as an LF SSW frame, the SSW frame sent on the second channel may be referred to as an HF SSW frame, and each NDP frame sent on the second channel may be referred to as an HF NDP frame. A length of the SSW frame on the first channel may be equal to a length of the SSW frame on the second channel. Certainly, the length of the SSW frame on the first channel may not be equal to the length of the SSW frame on the second channel. The foregoing description is merely an example for description. This is not limited in the disclosure.

Each NDP frame sent on the second channel may correspond to one sending direction. Each NDP frame includes an identifier of the sending direction corresponding to each NDP frame, and the identifier of the sending direction corresponding to each NDP frame includes at least one of the following information such as COWN information, an antenna identifier, a sector identifier, and the like. The SSW frame sent on the first channel may include identifiers of sending directions corresponding to some or all NDP frames.

In FIG. 22, the SSW frame sent on the second channel may alternatively be replaced with an NDP frame and a training sequence, and the training sequence may also correspond to one or more sending and/or receiving directions, to increase a quantity of sector sweep directions, and reduce a sweep time.

In FIG. 21 and FIG. 22, the SSW frame sent on the first channel may further include first indication information, to indicate communication capabilities of the station on the first channel and the second channel.

In FIG. 21 and FIG. 22, the SSW frame sent on the first channel may further include second indication information, to indicate whether the NDP frame is sent on the second channel in a current transmission period after the SSW frame is sent.

In FIG. 21 and FIG. 22, the SSW frame sent on the first channel may further include third indication information, to indicate a sending start time of the $1^{st}$ NDP frame on the second channel in the current transmission period or a relative time interval between the sending start time and a preset time.

In FIG. 21 and FIG. 22, the SSW frame sent on the first channel may further include fourth indication information, to indicate whether the SSW frame is sent on the first channel and the at least one NDP frame is sent on the second channel, in a transmission period after the current transmission period.

In the A-BFT period in the WLAN system, not all stations need to perform a sector sweep. In other words, some stations need to perform the sector sweep in the A-BFT period, and other stations do not need to perform the sector sweep. Therefore, in the A-BFT period, different stations may select different channels for communication. For example, a station that needs to perform the sector sweep uses the second channel for communication, and a station that does not need to perform the sector sweep uses the first channel for communication such that a conflict in the A-BFT period can be effectively reduced.

FIG. 23 is a schematic diagram of still another frame transmission on a first channel and a second channel in A-BFT in a communication method according to an embodiment of this application.

As shown in FIG. 23, in the A-BFT period, if a station 1 needs to perform a sector sweep, the station 1 may send an SSW frame to an AP or a PCP on the second channel, and further send at least one NDP frame to the AP or the PCP on the second channel after a preset time interval starting from a moment at which the SSW frame is sent. If a station 2 does not need to perform the sector sweep, the station 2 may send an SSW frame to the AP or the PCP on the first channel.

Before performing the communication method shown in FIG. 23, the AP or the PCP may send a beacon frame or an announcement frame (Announcement Frame) to the station 1 and the station 2. The beacon frame or the announcement frame carries a channel transmission indication. The station 1 may determine, based on the channel transmission indication, that the station 1 supports transmission on the second channel in the A-BFT period, and determine a quantity of slots on the second channel in the A-BFT period. The station 2 may determine, based on the channel transmission indication, that the station 2 supports transmission on the first channel in the A-BFT period, and determine a quantity of slots on the first channel in the A-BFT period. The channel transmission indication may be located at a location such as a reserved field, a newly added IE, or an extensible IE in the beacon frame or the announcement frame. The AP or the PCP may send the beacon frame or the announcement frame on the second channel.

After receiving the beacon frame or the announcement frame, the station 2 may further return a corresponding beacon transmission interval feedback (BTI Feedback) frame to the AP or the PCP on the first channel in the A-BFT period. In the A-BFT period, the AP or the PCP may return a corresponding SSW feedback frame to the station 1 on the second channel or the first channel.

Optionally, the communication method may also be applied to an announcement transmission interval (Announcement Transmission Interval, ATI) in the WLAN system.

In a possible implementation, in the ATI, the sending node may send a request (request) frame to the receiving node on the first channel, and receive a response (response) frame returned by the receiving node on the first channel. To be specific, the request frame and the response frame in the ATI may be transmitted only on the first channel, and do not need to be transmitted on the second channel. In other words, a request frame and a response frame in the ATI on the second channel may be removed.

In another possible implementation, in the ATI, some sending nodes may send a request frame to the receiving node on the first channel, and receive a response frame returned by the receiving node on the first channel. Some other sending nodes may send a request frame to the receiving node on the second channel, and receive a response frame returned by the receiving node on the second channel. To be specific, the request frame and the response frame in the ATI may be transmitted on both the first channel and the second channel. This may further improve communication efficiency in the ATI, to be specific, quantities of request frames and response frames that occur at the same time are increased.

In still another possible implementation, in the ATI, some sending nodes may send a request frame to the receiving node on the first channel, and receive a response frame returned by the receiving node on the second channel. Some other sending nodes may send a request frame to the receiving node on the second channel, and receive a response frame returned by the receiving node on the first channel. To be specific, the request frame and the response frame in the ATI may be transmitted on both the first channel and the second channel. This may further improve communication efficiency in the ATI, to be specific, quantities of request frames and response frames that occur at the same time are increased.

Figure 24:
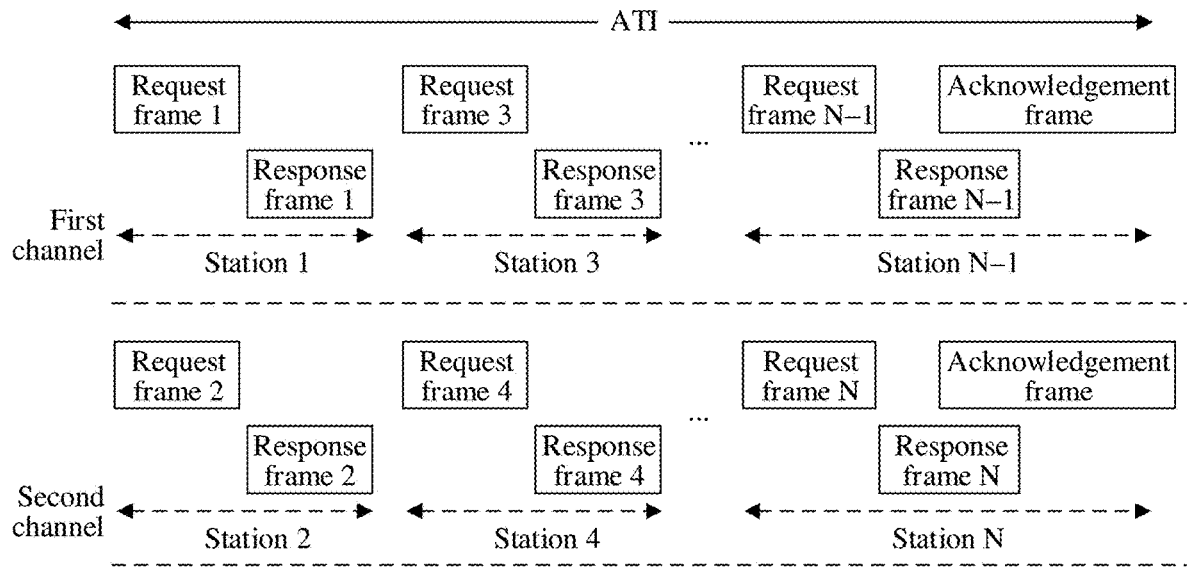
FIG. 24 is a schematic diagram of frame transmission on a first channel and a second channel in an ATI in a communication method according to an embodiment of this application.

FIG. 24 is a schematic diagram of frame transmission on a first channel and a second channel in an ATI in a communication method according to an embodiment of this application. FIG. 24 merely shows an optional implementation scenario. This is not limited in this application. As shown in FIG. 24, in the ATI, a station 1 may send a request frame 1 to an AP or a PCP on the first channel, and receive a response frame 1 returned by the AP or the PCP on the first channel; a station 2 may send a request frame 2 to the AP or the PCP on the second channel, and receive a response frame 2 returned by the AP or the PCP on the second channel; a station 3 may send a request frame 3 to the AP or the PCP on the first channel, and receive a response frame 3 returned by the AP or the PCP on the first channel; a station 4 may send a request frame 4 to the AP or the PCP on the second channel, and receive a response frame 4 returned by the AP or the PCP on the second channel; . . . ; a station N−1 may send a request frame N−1 to the AP or the PCP on the first channel, and receive a response frame N−1 returned by the AP or the PCP on the first channel; and a station N may send a request frame N to the AP or the PCP on the second channel, and receive a response frame N returned by the AP or the PCP on the second channel.

After receiving the response frame N−1, the station N−1 may further return an acknowledgement frame to the AP or the PCP on the first channel. After receiving the response frame N, the station N may further return an acknowledgement frame to the AP or the PCP on the second channel.

Optionally, an embodiment of this application may further provide some channel assisted communication methods performed in other phases in the WLAN system. In an optional instance, the AP or the PCP may send a control frame or a management frame to the station on the first channel, and receive a data frame or a sweep frame returned by the station on the second channel. For example, the control frame or the management frame may be any one of a trigger frame, a direct link security setup request (DLS setup request) frame, a direct link security setup response (DLS setup response) frame, an associate request frame, an associate response frame, a probe request frame, and the like. For example, the sweep frame may include the NDP frame, the SSSW frame, the Qos Non frame, the short beacon frame, the frame including only the physical layer header, or the other frame shown above. The first channel may be a low frequency channel, and the second channel may be a high frequency channel. The first channel and the second channel may alternatively be different high frequency channels.

For example, the station may return the data frame or the sweep frame to the AP or the PCP on the second channel in a preset reply manner. For example, the preset reply manner may include at least one of the following such as a frequency division multiple access (FDMA) manner, an orthogonal frequency division multiple access (OFDMA) manner, a multiple-input multiple-output (MIMO) manner, or the like.

If the first channel is a low frequency channel, and the second channel is a high frequency channel, for example, different stations are located in different directions, when the control frame or the management frame is sent on the first channel in the foregoing communication manner, a plurality of control frames or management frames do not need to be sent on the second channel. This reduces a quantity of control frames or management frames sent by the AP or the PCP.

It should be noted that the control frame or the management frame may include one piece of indication information, to indicate whether a channel corresponding to data frames or sweep frames returned by all stations is the first channel or the second channel. The indication information may be located in at least one bit in a common part (common part) in the control frame or the management frame.

The control frame or the management frame may further include another piece of indication information, to indicate whether a channel corresponding to a data frame or a sweep frame returned by each station is the first channel or the second channel. The other piece of indication information may be located in at least one bit in a user specific part that is in the control frame or the management frame and that corresponds to each station.

In another optional instance, the sending node may send a request frame to the receiving node on the first channel, receive a response frame returned by the receiving node on the first channel, and then send a data frame or a sweep frame to the receiving node on the second channel. The sending node may be an AP or a PCP, or may be a station. The receiving node may be an AP or a PCP, or may be a station. The first channel may be a low frequency channel, and the second channel may be a high frequency channel. The first channel and the second channel may alternatively be different high frequency channels.

The request frame is a request to send (RTS) frame, a multi-user request to send (MU-RTS) frame, or another similar response frame. The response frame may be a clear to send (CTS) frame, a multi-user clear to send (MU-CTS) frame, a multi-user directional multi-gigabit clear to send (Multi User-DMG-Clear To Send, MU-DMG-CTS) frame, or a response frame in another type. The sweep frame may be the NDP frame, the SSSW frame, the Qos non frame, the short beacon frame, the frame including only the physical layer header, or the other frame.

If the first channel is a low frequency channel, and the second channel is a high frequency channel, for example, different sending nodes or receiving nodes are located in different directions, when the request frame or the response frame is transmitted with the receiving node on the first channel in the foregoing communication manner, a plurality of request frames or a plurality of response frames do not need to be transmitted on the second channel. This reduces a quantity of request frames or response frames transmitted between the sending node and the receiving node.

It should be noted that the response frame may include one piece of indication information, to indicate whether a channel corresponding to data frames or sweep frames returned by all sending nodes is the first channel or the second channel. The indication information may be located in at least one bit in a common part in the response frame.

The response frame may further include another piece of indication information, to indicate whether a channel corresponding to a data frame or a sweep frame returned by each sending node is the first channel or the second channel. The other piece of indication information may be located in at least one bit in a user specific part that is in the control frame or the management frame and that corresponds to each sending node.

Optionally, if the communication method shown above is applicable to a mobile communications system, such as a 5G mobile communications system, in a synchronization signal transmission phase, the sending node is a network device such as a base station, and the receiving node is user equipment.

The first frame includes a synchronization signal (SS), and the second frame includes a preamble.

The SS may be a primary synchronization signal (PSS), or may be a secondary synchronization signal (SSS).

Figure 25:
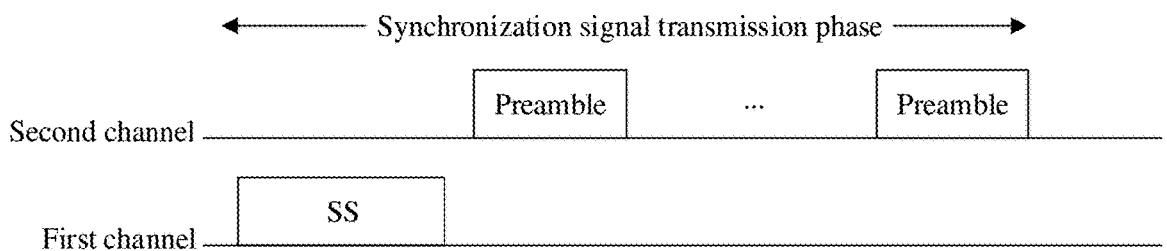
FIG. 25 is a schematic diagram of frame transmission on a first channel and a second channel in a synchronization signal transmission phase in a communication method according to an embodiment of this application.
Figure 26:
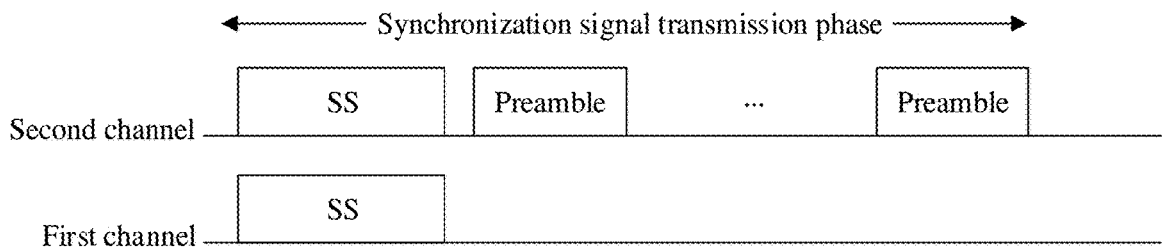
FIG. 26 is a schematic diagram of another frame transmission on a first channel and a second channel in a synchronization signal transmission phase in a communication method according to an embodiment of this application.

FIG. 25 is a schematic diagram of frame transmission on a first channel and a second channel in a synchronization signal transmission phase in a communication method according to an embodiment of this application. FIG. 26 is a schematic diagram of another frame transmission on a first channel and a second channel in a synchronization signal transmission phase in a communication method according to an embodiment of this application. In the communication method, if the first channel is a low frequency channel, and the second channel is a high frequency channel, the synchronization signal transmission phase shown in FIG. 25 and FIG. 26 may be referred to as a synchronization signal transmission phase with low frequency channel assistance.

It can be learned from FIG. 25 that in the synchronization signal transmission phase, a base station may serve as a sending node to send an SS to user equipment on the first channel, and to send at least one preamble to the user equipment on the second channel after a preset time interval starting from a moment at which the SS frame is sent.

It can be learned from FIG. 26 that in the synchronization signal transmission phase, a base station may serve as a sending node to send an SS to user equipment on the first channel, and the base station also sends an SS on the second channel. The base station further sends at least one preamble to the user equipment on the second channel after a preset time interval starting from a moment at which the SS is sent on the first channel.

If the first channel is a low frequency channel, and the second channel is a high frequency channel, in FIG. 25 and FIG. 26, the SS sent on the first channel may be referred to as an LF SS, the SS sent on the second channel may be referred to as an HF SS, and each preamble sent on the second channel may be referred to as an HF preamble. A length of the SS on the first channel may be equal to a length of the SS on the second channel. In an embodiment, the length of the SS on the first channel may not be equal to the length of the SS on the second channel. The foregoing description is merely an example for description. This is not limited in the disclosure.

Each preamble sent on the second channel may correspond to one sending direction. Each preamble includes an identifier of the sending direction corresponding to each preamble, and the identifier of the sending direction corresponding to each preamble includes at least one of the following information such as COWN information, an antenna identifier, a sector identifier, and the like.

The SS sent on the first channel may include identifiers of sending directions corresponding to some or all preambles.

In FIG. 25 and FIG. 26, the SS sent on the first channel may further include first indication information, to indicate communication capabilities of the base station on the first channel and the second channel.

In FIG. 25 and FIG. 26, the SS sent on the first channel may further include second indication information, to indicate whether the preamble is sent on the second channel in a current transmission period after the SS is sent.

In FIG. 25 and FIG. 26, the SS sent on the first channel may further include third indication information, to indicate a sending start time of the $1^{st}$ preamble on the second channel in the current transmission period or a relative time interval between the sending start time and a preset time.

In FIG. 25 and FIG. 26, the SS sent on the first channel may further include fourth indication information, to indicate whether the SS is sent on the first channel and the at least one preamble is sent on the second channel, in a transmission period after the current transmission period.

The first indication information, the second indication information, the third indication information, and the fourth indication information may also be located at any one of the following locations such as a newly added bit on an existing physical downlink control channel (PDCCH), a newly added PDCCH, a newly added MAC control element, newly added radio resource control (RRC) signaling, and the like. The RRC signaling may be broadcast signaling, or may be user equipment dedicated signaling (UE Dedicated Signaling).

Optionally, if the communication method shown above is applicable to a mobile communications system, such as a 5G mobile communications system, in a random access phase, the sending node is user equipment, and the receiving node is a network device such as a base station.

The first frame includes information about a random access signal, and the second frame includes a preamble.

The random access signal may be a physical random access channel (PRACH). The information about the random access signal may be signaling related to the PRACH.

Figure 27:
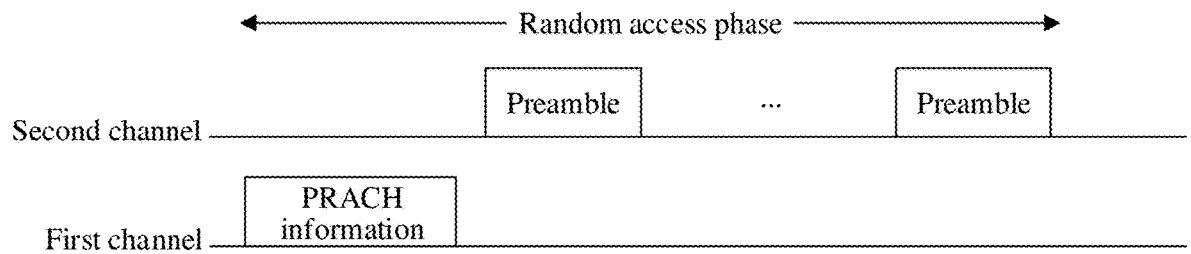
FIG. 27 is a schematic diagram of frame transmission on a first channel and a second channel in a random access phase in a communication method according to an embodiment of this application.
Figure 28:
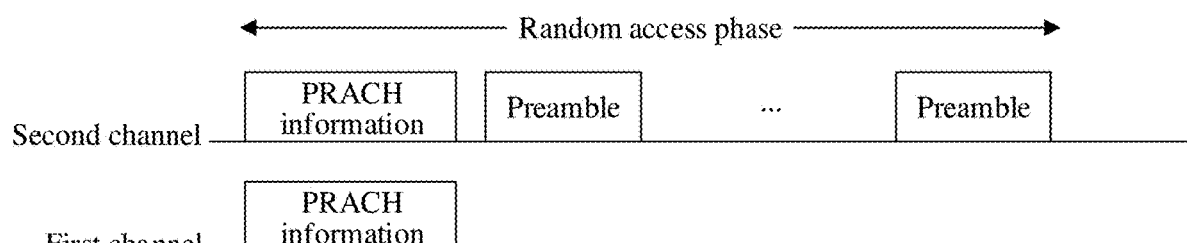
FIG. 28 is a schematic diagram of another frame transmission on a first channel and a second channel in a random access phase in a communication method according to an embodiment of this application.

FIG. 27 is a schematic diagram of frame transmission on a first channel and a second channel in a random access phase in a communication method according to an embodiment of this application. FIG. 28 is a schematic diagram of another frame transmission on a first channel and a second channel in a random access phase in a communication method according to an embodiment of this application. In the communication method, if the first channel is a low frequency channel, and the second channel is a high frequency channel, the random access phase shown in FIG. 27 and FIG. 28 may be referred to as a random access phase with low frequency channel assistance.

It can be learned from FIG. 27 that in the random access phase, a base station may serve as a sending node to send PRACH information to user equipment on the first channel, and to send at least one preamble to the user equipment on the second channel after a preset time interval starting from a moment at which the PRACH information is sent.

It can be learned from FIG. 28 that in the random access phase, a base station may serve as a sending node to send PRACH information to user equipment on the first channel, and the base station also sends PRACH information on the second channel. The base station further sends at least one preamble to the user equipment on the second channel after a preset time interval starting from a moment at which the PRACH information is sent on the first channel.

If the first channel is a low frequency channel, and the second channel is a high frequency channel, in FIG. 27 and FIG. 28, the PRACH information sent on the first channel may be referred to as LF PRACH information, the PRACH information sent on the second channel may be referred to as HF PRACH information, and each preamble sent on the second channel may be referred to as an HF preamble. A length of the PRACH information on the first channel may be equal to a length of the PRACH information on the second channel. In an embodiment, the length of the PRACH information on the first channel may not be equal to the length of the PRACH information on the second channel. The foregoing description is merely an example for description. This is not limited in this application.

Each preamble sent on the second channel may correspond to one sending direction. Each preamble includes an identifier of the sending direction corresponding to the preamble, and the identifier of the sending direction corresponding to each preamble includes at least one of the following information such as COWN information, an antenna identifier, a sector identifier, and the like.

The PRACH information sent on the first channel may include identifiers of sending directions corresponding to some or all preambles.

In FIG. 28, the PRACH information sent on the second channel may alternatively be replaced with a preamble. If the preamble is sent on the second channel, the preamble may correspond to one sending direction, to increase a quantity of sector sweep directions, and reduce a sweep time.

In FIG. 27 and FIG. 28, the PRACH information sent on the first channel may further include first indication information, to indicate communication capabilities of the base station on the first channel and the second channel.

In FIG. 27 and FIG. 28, the PRACH information sent on the first channel may further include second indication information, to indicate whether a sweep frame such as the preamble is sent on the second channel in a current transmission period after the PRACH information is sent.

In FIG. 27 and FIG. 28, the PRACH information sent on the first channel may further include third indication information, to indicate a sending start time of the $1^{st}$ preamble on the second channel in the current transmission period or a relative time interval between the sending start time and a preset time.

In FIG. 27 and FIG. 28, the PRACH information sent on the first channel may further include fourth indication information, to indicate whether the PRACH information is sent on the first channel and the at least one preamble is sent on the second channel, in a transmission period after the current transmission period.

The first indication information, the second indication information, the third indication information, and the fourth indication information may also be located at any one of the following locations such as a newly added bit on an existing PDCCH, a newly added PDCCH, a newly added MAC control element, newly added RRC signaling, and the like. The RRC signaling may be broadcast signaling, or may be user equipment dedicated signaling.

Optionally, if the communication method is applied to a mobile communications system, such as a 5G mobile communications system, in a sector sweep phase, the sending node is user equipment, and the receiving node is a network device such as a base station.

The first frame may include a sweep frame, and the second frame includes a preamble.

Figure 29:
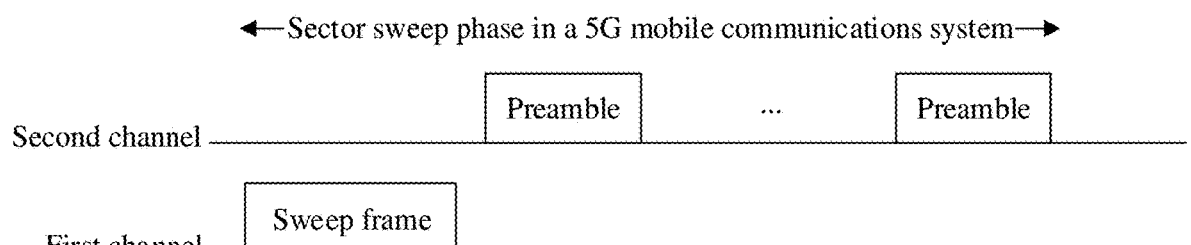
FIG. 29 is a schematic diagram of frame transmission on a first channel and a second channel in a sector sweep phase in a fifth-generation cellular wireless (5G) mobile communications system in a communication method according to an embodiment of this application.
Figure 30:
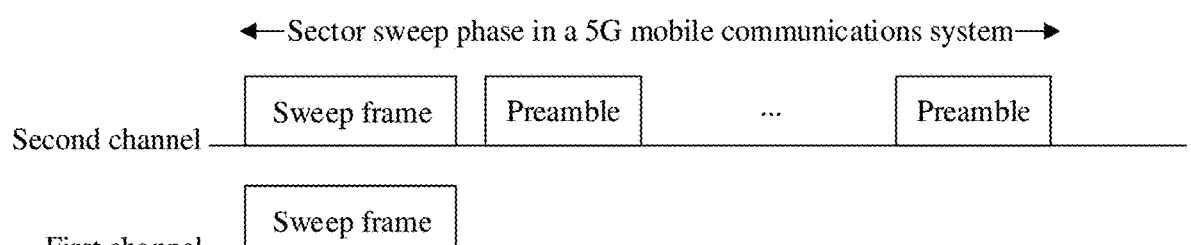
FIG. 30 is a schematic diagram of another frame transmission on a first channel and a second channel in a sector sweep phase in a 5G mobile communications system in a communication method according to an embodiment of this application.

In the sector sweep phase in the 5G mobile communications system, an example in which the first frame is the sweep frame and the second frame is the preamble is used below for description. FIG. 29 is a schematic diagram of frame transmission on a first channel and a second channel in a sector sweep phase in a 5G mobile communications system in a communication method according to an embodiment of this application. FIG. 30 is a schematic diagram of another frame transmission on a first channel and a second channel in a sector sweep phase in a 5G mobile communications system in a communication method according to an embodiment of this application. In the communication method, if the first channel is a low frequency channel, and the second channel is a high frequency channel, the sector sweep phase shown in FIG. 29 and FIG. 30 may be referred to as a sector sweep phase with low frequency channel assistance.

It can be learned from FIG. 29 that in the sector sweep phase in the 5G mobile communications system, user equipment may serve as a sending node to send a sweep frame to a base station on the first channel, and to send at least one preamble to the base station on the second channel after a preset time interval starting from a moment at which the sweep frame is sent. If the first channel is a low frequency channel, and the second channel is a high frequency channel, the sweep frame sent on the first channel may be referred to as an LF sweep frame, and each preamble sent on the second channel may be referred to as an HF preamble. Each preamble sent on the second channel may correspond to one sending direction. The sweep frame sent on the first channel may include identifiers of sending directions corresponding to all preambles.

It can be learned from FIG. 30 that in the sector sweep phase in the 5G mobile communications system, user equipment may serve as a sending node to send a sweep frame to a base station on the first channel, and the user equipment also sends a sweep frame on the second channel. The user equipment further sends at least one preamble to the base station on the second channel after a preset time interval starting from a moment at which the sweep frame is sent on the first channel. If the first channel is a low frequency channel, and the second channel is a high frequency channel, the sweep frame sent on the first channel may be referred to as an LF sweep frame, the sweep frame sent on the second channel may be referred to as an HF sweep frame, and each preamble sent on the second channel may be referred to as an HF preamble. A length of the sweep frame on the first channel may be equal to a length of the sweep frame on the second channel. Certainly, the length of the sweep frame on the first channel may not be equal to the length of the sweep frame on the second channel. The foregoing description is merely an example for description. This is not limited in the disclosure.

Each preamble sent on the second channel may correspond to one sending direction. Each preamble includes an identifier of the sending direction corresponding to each preamble, and the identifier of the sending direction corresponding to each preamble includes at least one of the following information, for example, COWN information, an antenna identifier, a sector identifier, and the like.

The sweep frame sent on the first channel may include identifiers of sending directions corresponding to some or all preambles.

In FIG. 29, the sweep frame sent on the second channel may alternatively be replaced with a preamble, and the preamble may also correspond to one sending direction, to increase a quantity of sector sweep directions, and reduce a sweep time.

In FIG. 29 and FIG. 30, the sweep frame sent on the first channel may further include first indication information, to indicate communication capabilities of the user equipment on the first channel and the second channel.

In FIG. 29 and FIG. 30, the sweep frame sent on the first channel may further include second indication information, to indicate whether the preamblee is sent on the second channel in a current transmission period after the SSW frame is sent.

In FIG. 29 and FIG. 30, the sweep frame sent on the first channel may further include third indication information, to indicate a sending start time of the first ($1^{st}$) preamble on the second channel in the current transmission period or a relative time interval between the sending start time and a preset time.

In FIG. 29 and FIG. 30, the sweep frame sent on the first channel may further include fourth indication information, to indicate whether the sweep frame is sent on the first channel and the at least one preamble is sent on the second channel, in a transmission period after the current transmission period.

The first indication information, the second indication information, the third indication information, and the fourth indication information may also be located at any one of the following locations such as a newly added bit on an existing PDCCH, a newly added PDCCH, a newly added MAC control element, newly added RRC signaling, and the like. The RRC signaling may be broadcast signaling, or may be user equipment dedicated signaling.

Figure 31:
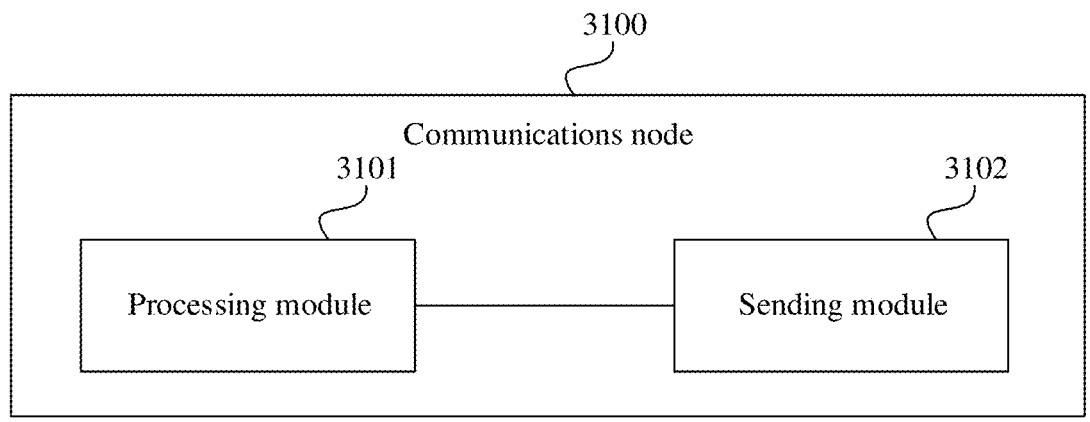
FIG. 31 is a schematic structural diagram 1 of a communications node according to an embodiment of this application.

An embodiment of this application may further provide a communications node. It should be understood that the communications node in this embodiment may serve as a sending node, and has any function of the sending node in the foregoing method. FIG. 31 is a schematic structural diagram 1 of a communications node 3100 according to an embodiment of this application. As shown in FIG. 31, the communications node 3100 may include a processing module 3101 configured to control to send a first frame to a receiving node on a first channel, and to send at least one second frame to the receiving node on a second channel, where a frequency of the first channel is less than a frequency of the second channel, each second frame corresponds to one sending direction, and a length of each second frame is less than a preset frame length; and a sending module 3102 configured to send the first frame to the receiving node on the first channel, and send the at least one second frame to the receiving node on the second channel.

The preset frame length is a length of a frame sent by the sending node on the second channel in each direction before the first channel is used for sharing and coordination. In this application, because the first channel is used for sharing and coordination, the length of the second frame in each direction that is sent on the second channel is less than the preset frame length.

Optionally, the communications node 3100 shown above may further cooperate with the sending module 3102 using the processing module 3101, to perform any other communication method performed by the sending node.

The communications node 3100 provided in this embodiment of this application may perform the communication method performed by the sending node shown in any one of the foregoing descriptions. For a specific implementation process and a beneficial effect thereof, refer to the foregoing descriptions. Details are not described herein again.

Figure 32:
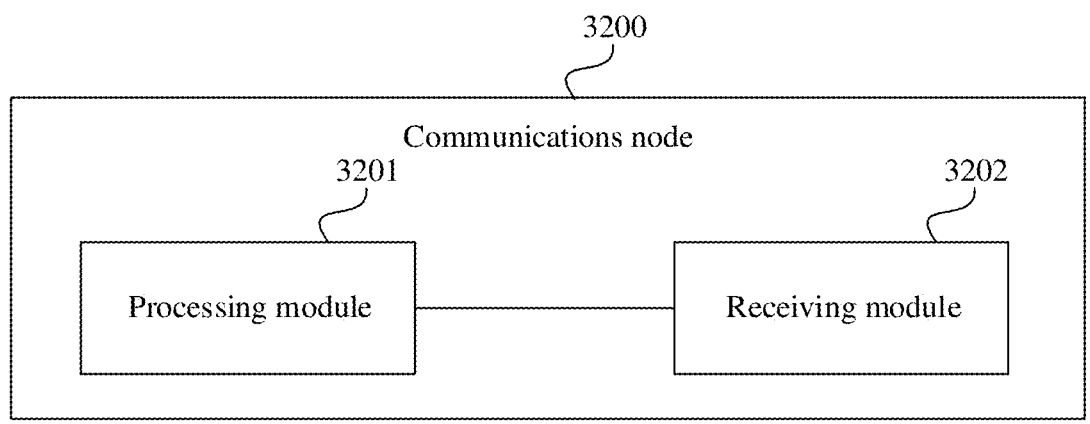
FIG. 32 is a schematic structural diagram 1 of another communications node according to an embodiment of this application.

An embodiment of this application may further provide a communications node. It should be understood that the communications node in this embodiment may serve as a receiving node, and has any function of the receiving node in the foregoing method. FIG. 32 is a schematic structural diagram 1 of another communications node according to an embodiment of this application. As shown in FIG. 32, the communications node 3200 includes a processing module 3201 configured to control to receive, on a first channel, a first frame sent by a sending node, and to receive, on a second channel, at least one second frame sent by the sending node, where a frequency of the first channel is less than a frequency of the second channel, each second frame corresponds to one sending direction, and a length of each second frame is less than a preset frame length; and a receiving module 3202 configured to receive, on the first channel, the first frame sent by the sending node, and receive, on the second channel, the at least one second frame sent by the sending node.

Optionally, the communications node 3200 shown above may further cooperate with the receiving module 3202 using the processing module 3201, to perform any other communication method performed by the receiving node.

The communications node provided in this embodiment of this application may perform the communication method performed by the receiving node shown in any one of the foregoing descriptions. For a specific implementation process and a beneficial effect thereof, refer to the foregoing descriptions. Details are not described herein again.

Figure 33:
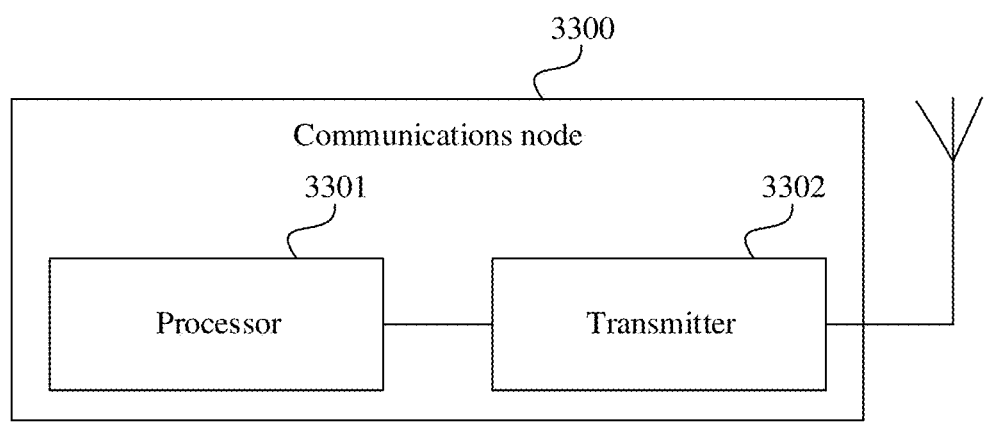
FIG. 33 is a schematic structural diagram 2 of a communications node according to an embodiment of this application.

An embodiment of this application may further provide a communications node. FIG. 33 is a schematic structural diagram 2 of a communications node according to an embodiment of this application. It should be understood that the communications node in this embodiment may serve as a sending node, and has any function of the sending node in the foregoing method. As shown in FIG. 33, the communications node 3300 may include a processor 3301 and a transmitter 3302. The processor 3301 is connected to the transmitter 3302.

The processor 3301 is configured to control to send a first frame to a receiving node on a first channel, and to send at least one second frame to the receiving node on a second channel, where a frequency of the first channel is less than a frequency of the second channel, each second frame corresponds to one sending direction, and a length of each second frame is less than a preset frame length.

The transmitter 3302 is configured to send the first frame to the receiving node on the first channel, and send the at least one second frame to the receiving node on the second channel.

Optionally, the communications node 3300 shown above may further cooperate with the transmitter 3302 using the processor 3301, to perform any other communication method performed by the sending node.

Optionally, an embodiment of this application further provides a computer program product including an instruction. The computer program product includes program code used to perform the communication method performed by the sending node shown in any one of the foregoing descriptions.

Optionally, an embodiment of this application further provides a computer readable storage medium. The computer readable storage medium is configured to store a computer program product, and the computer program product includes program code. The program code may include program code used to perform the communication method performed by the sending node shown in any one of the foregoing descriptions.

The computer readable storage medium may be an internal memory in the communications node 3300 shown in FIG. 33, or may be an external memory connected to the communications node 3300.

For example, the program code in the computer program product may be executed by the processor 3301 in the communications node 3300 shown in FIG. 33, to control the transmitter 3302 such that the transmitter 3302 performs the communication method performed by the sending node shown in any one of the foregoing descriptions.

Functions of the computer program product may be implemented using hardware or software. When the functions are implemented using software, the functions may be stored in a computer readable storage medium or transmitted as one or more instructions or code in the computer readable storage medium.

The communications node, the computer readable storage medium, and the computer program product in the embodiments of this application may perform the communication method performed by the sending node shown in any one of the foregoing descriptions. For specific implementation processes and beneficial effects thereof, refer to the foregoing descriptions. Details are not described herein again.

Figure 34:
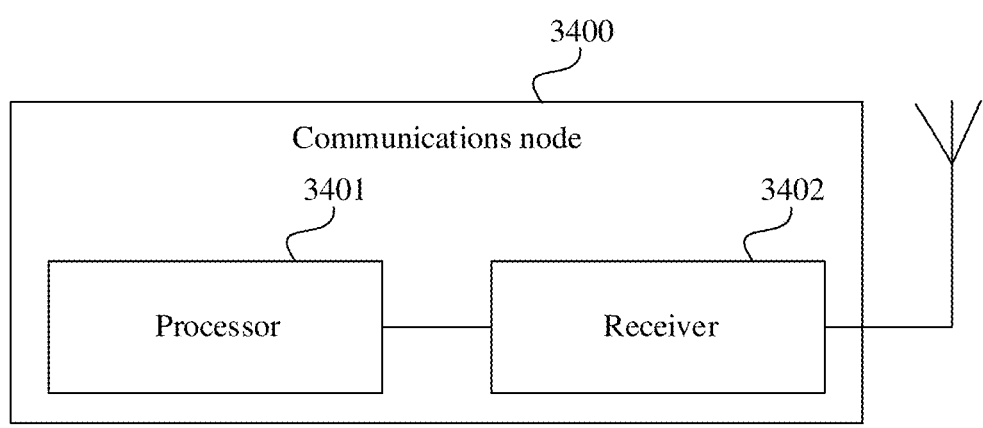
FIG. 34 is a schematic structural diagram 2 of another communications node according to an embodiment of this application.

An embodiment of this application may further provide a communications node. FIG. 34 is a schematic structural diagram 2 of another communications node according to an embodiment of this application. It should be understood that the communications node in this embodiment may serve as a receiving node, and has any function of the receiving node in the foregoing method. As shown in FIG. 34, the communications node 3400 includes a processor 3401 and a receiver 3402. The processor 3401 is connected to the receiver 3402.

The processor 3401 is configured to control to receive, on a first channel, a first frame sent by a sending node, and to receive, on a second channel, at least one second frame sent by the sending node, where a frequency of the first channel is less than a frequency of the second channel, each second frame corresponds to one sending direction, and a length of each second frame is less than a preset frame length.

The receiver 3402 is configured to receive, on the first channel, the first frame sent by the sending node, and receive, on the second channel, the at least one second frame sent by the sending node.

Optionally, the communications node 3400 shown above may further cooperate with the receiver 3402 using the processor 3401, to perform any other communication method performed by the receiving node.

Optionally, an embodiment of this application further provides a computer program product including an instruction. The computer program product includes program code used to perform the communication method performed by the receiving node shown in any one of the foregoing descriptions.

Optionally, an embodiment of this application further provides a computer readable storage medium. The computer readable storage medium is configured to store a computer program product, and the computer program product includes program code. The program code may include program code used to perform the communication method performed by the receiving node shown in any one of the foregoing descriptions.

The computer readable storage medium may be an internal memory in the communications node 3400 shown in FIG. 34, or may be an external memory connected to the communications node 3400.

For example, the program code in the computer program product may be executed by the processor 3401 in the communications node 3400 shown in FIG. 34, to control the receiver 3402 such that the receiver 3402 performs the communication method performed by the receiving node shown in any one of the foregoing descriptions.

Functions of the computer program product may be implemented using hardware or software. When the functions are implemented using software, the functions may be stored in a computer readable storage medium or transmitted as one or more instructions or code in the computer readable storage medium.

The communications node, the computer readable storage medium, and the computer program product in the embodiments of this application may perform the communication method performed by the receiving node shown in any one of the foregoing descriptions. For specific implementation processes and beneficial effects thereof, refer to the foregoing descriptions. Details are not described herein again.

It should be noted that all or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedure or functions according to the embodiments of this application are completely or partially generated. The computer may be a general-purpose computer, a dedicated computer, a computer network, or another programmable apparatus. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A communications node, comprising:
    a processor; and
    a transmitter coupled to the processor and configured to:
        send a first frame to a receiving node on a first channel, wherein the first frame comprises first indication information, and wherein the first indication information indicates communication capabilities of the communications node on the first channel and a second channel; and
        send at least one second frame to the receiving node on the second channel, wherein a first frequency of the first channel is less than a second frequency of the second channel, wherein each of the at least one second frame corresponds to a sending direction, and wherein a length of each of the second frames is less than a preset frame length.

2. The communications node of claim 1, wherein the transmitter is further configured to send the at least one second frame to the receiving node on the second channel after a preset time interval that starts from a moment when sending of the first frame ends.

3. The communications node of claim 1, wherein the first frame comprises an identifier of a corresponding sending direction, and wherein the identifier corresponds to the at least one second frame.

4. The communications node of claim 1, wherein each of the at least one second frame comprises an identifier of the sending direction that corresponds to each of the at least one second frame.

5. The communications node of claim 1, wherein in a beacon transmission interval (BTI), the first frame comprises a beacon frame and the at least one second frame comprises one of a null data packet (NDP) frame, a short sector sweep (SSSW) frame, a non-quality-of-service (non-QoS) frame, a short beacon frame, or a frame comprising only a physical layer header, or wherein in a sector sweep phase, the sector sweep phase is within an association beamforming training (A-BFT) period or a data transfer interval (DTI), the first frame comprises a sector sweep (SSW) frame or the SSSW frame, and the at least one second frame comprises an NDP frame or another frame comprising only a physical layer header.

6. The communications node of claim 1, wherein the first frame further comprises second indication information, and wherein the second indication information indicates whether the at least one second frame is sent on the second channel in a current transmission period.

7. The communications node of claim 6, wherein the first frame further comprises third indication information, and wherein the third indication information indicates a sending start time of the at least one second frame in the current transmission period or a relative time interval between the sending start time and a preset time.

8. The communications node of claim 7, wherein the first frame further comprises fourth indication information, and wherein the fourth indication information indicates whether the first frame is sent on the first channel and whether the at least one second frame is sent on the second channel in a transmission period after the current transmission period.

9. The communications node of claim 8, wherein the first frame further comprises fifth indication information, and wherein the fifth indication information indicates:
    a sending time of the first frame in the transmission period after the current transmission period;
    a second relative time interval between the sending time of the first frame in the transmission period after the current transmission period and a second preset time in the current transmission period; or
    an identifier of the transmission period that is after the current transmission period and in which the first frame is located.

10. A communications node, comprising:
    a processor; and
    a receiver coupled to the processor and configured to:
        receive, on a first channel, a first frame from a sending node, wherein the first frame comprises first indication information, and wherein the first indication information indicates communication capabilities of the sending node on the first channel and a second channel; and
        receive, on the second channel, at least one second frame from the sending node, wherein a first frequency of the first channel is less than a second frequency of the second channel, wherein each of the at least one second frame corresponds to a sending direction, and wherein a length of each of the second frames is less than a preset frame length.

11. The communications node of claim 10, wherein the receiver is further configured to receive the at least one second frame from the sending node after a preset time interval that starts from a moment when sending of the first frame ends.

12. The communications node of claim 10, wherein the first frame comprises an identifier of a corresponding sending direction, and wherein the identifier corresponds to the at least one second frame.

13. The communications node of claim 10, wherein each of the at least one second frame comprises an identifier of a corresponding sending direction, and wherein the identifier corresponds to each of the at least one second frame.

14. The communications node of claim 10, wherein the first frame further comprises second indication information, and wherein the second indication information indicates whether the at least one second frame is sent on the second channel in a current transmission period.

15. The communications node of claim 14, wherein the first frame further comprises third indication information, and wherein the third indication information indicates a sending start time of the at least one second frame in the current transmission period or a relative time interval between the sending start time and a preset time.

16. The communications node of claim 15, wherein the first frame further comprises fourth indication information, and wherein the fourth indication information indicates whether the first frame is sent on the first channel and whether the at least one second frame is sent on the second channel in a transmission period after the current transmission period.

17. The communications node of claim 16, wherein the first frame further comprises fifth indication information, and wherein the fifth indication information indicates:
- a sending time of the first frame in the transmission period after the current transmission period;
- a second relative time interval between the sending time of the first frame in the transmission period after the current transmission period and a second preset time in the current transmission period; or
- an identifier of the transmission period that is after the current transmission period and in which the first frame is located.

18. A non-transitory computer readable storage medium configured to store a computer program product, wherein the computer program product comprises program code that when executed by a processor causes the processor of a communications node to be configured to:
- send a first frame to a receiving node on a first channel, wherein the first frame comprises first indication information, and wherein the first indication information indicates communication capabilities of the communications node on the first channel and a second channel; and
- send at least one second frame to the receiving node on a second channel, wherein a first frequency of the first channel is less than a second frequency of the second channel, wherein each of the at least one second frame corresponds to a sending direction, and wherein a length of each of the second frames is less than a preset frame length.

19. The non-transitory computer readable storage medium of claim 18, wherein the processor of the communications node is further configured to send the at least one second frame to the receiving node on the second channel after a preset time interval that starts from a moment when sending of the first frame ends.

20. The non-transitory computer readable storage medium of claim 18, wherein the first frame comprises an identifier of a corresponding sending direction, and wherein the identifier corresponds to the at least one second frame.

* * * * *